(12) United States Patent
Kadnikov et al.

(10) Patent No.: US 10,189,323 B2
(45) Date of Patent: Jan. 29, 2019

(54) TRAILER COUPLING

(71) Applicant: Scambia Holdings Cyprus Limited, Limassol (CY)

(72) Inventors: Aleksej Kadnikov, Leonberg (DE); Wolfgang Gentner, Steinheim (DE); Bernhard Rimmelspacher, Rheinstetten (DE)

(73) Assignee: Bosal ACPS Holding 2 B.V., PK Vianen (NL)

( * ) Notice: Subject to any disclaimer, the term of this patent is extended or adjusted under 35 U.S.C. 154(b) by 145 days.

(21) Appl. No.: 15/261,323

(22) Filed: Sep. 9, 2016

(65) Prior Publication Data

US 2017/0072753 A1 Mar. 16, 2017

(30) Foreign Application Priority Data

Sep. 11, 2015 (DE) .......................... 10 2015 115 357

(51) Int. Cl.
| | |
|---|---|
| *B60D 1/06* | (2006.01) |
| *B60D 1/54* | (2006.01) |
| *B60D 1/24* | (2006.01) |
| *B60D 1/44* | (2006.01) |
| *B60D 1/46* | (2006.01) |

(52) U.S. Cl.
CPC ............... *B60D 1/065* (2013.01); *B60D 1/06* (2013.01); *B60D 1/246* (2013.01); *B60D 1/44* (2013.01); *B60D 1/46* (2013.01); *B60D 1/54* (2013.01)

(58) Field of Classification Search
CPC ... B60D 1/06; B60D 1/44; B60D 1/46; B60D 1/54; B60D 1/065; B60D 1/246
USPC .......................................................... 280/512
See application file for complete search history.

(56) References Cited

U.S. PATENT DOCUMENTS

2008/0073874 A1 3/2008 Riehle et al.

FOREIGN PATENT DOCUMENTS

| | | | |
|---|---|---|---|
| DE | 19858978 | 11/2005 | |
| EP | 1 741 572 | 1/2007 | |
| EP | 1741572 A1 * | 1/2007 | ............... B60D 1/26 |
| EP | 2266820 | 6/2013 | |
| EP | 1790504 | 7/2014 | |

* cited by examiner

*Primary Examiner* — Anne Marie M Boehler
*Assistant Examiner* — Felicia L. Brittman
(74) *Attorney, Agent, or Firm* — Reinhart Boerner Van Deuren P.C.

(57) ABSTRACT

The invention provides a trailer coupling including a ball neck movable between an operative position and a rest position. A coupling ball and a pivot bearing unit are fixed to the vehicle. A rotation blocking arrangement has at least two rotation blocking bodies. An actuating body has a respective cam face that runs transversely to the guide direction for each of the rotation blocking bodies arranged to be rotatable about the pivot axis. As a result of the rotary movement in a direction of actuation the at least two rotation blocking bodies are movable in the guide direction. A release position latching arrangement is movable between a latch release position and a latching position that fixes the actuating body in relation to the guide body.

58 Claims, 20 Drawing Sheets

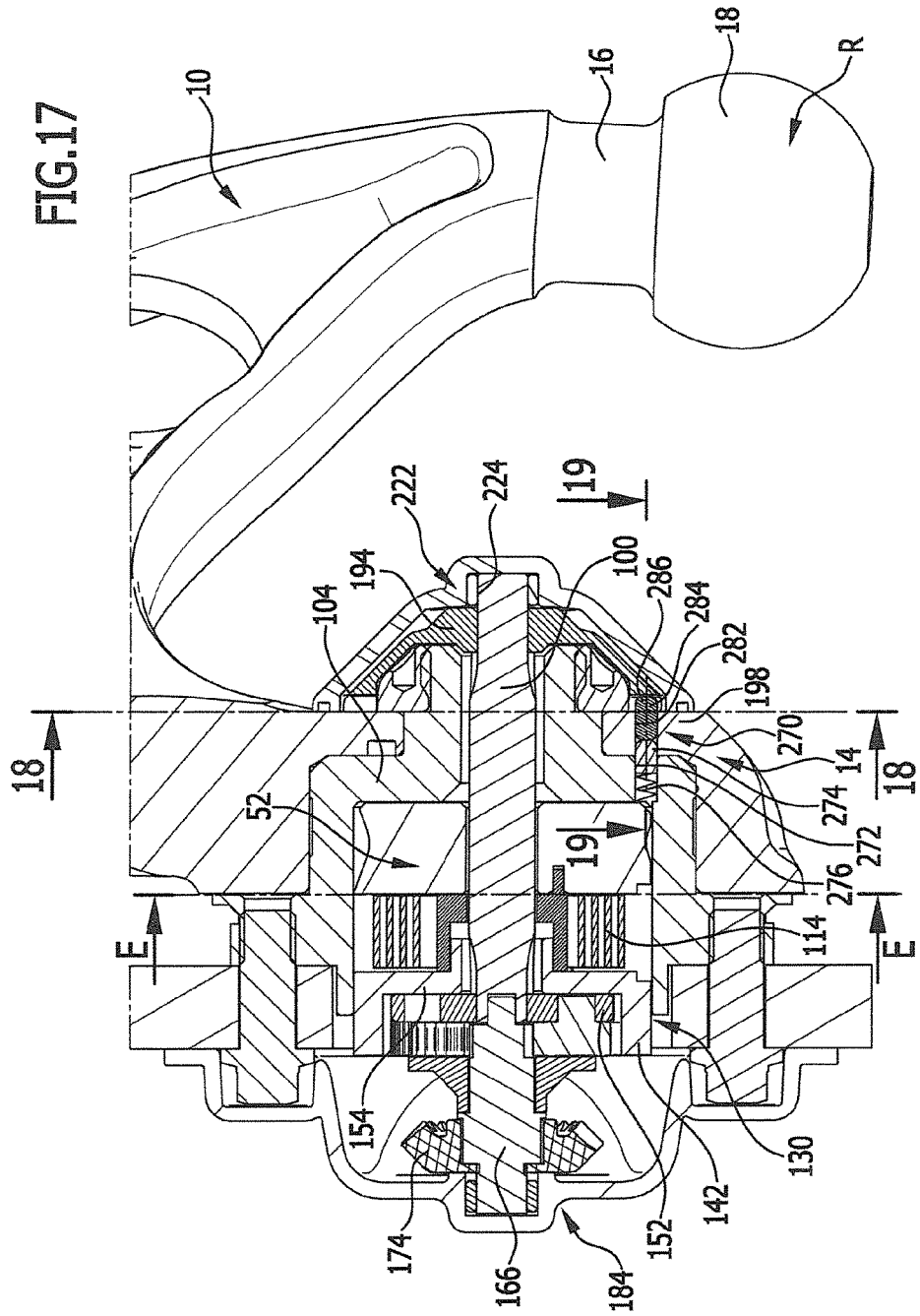

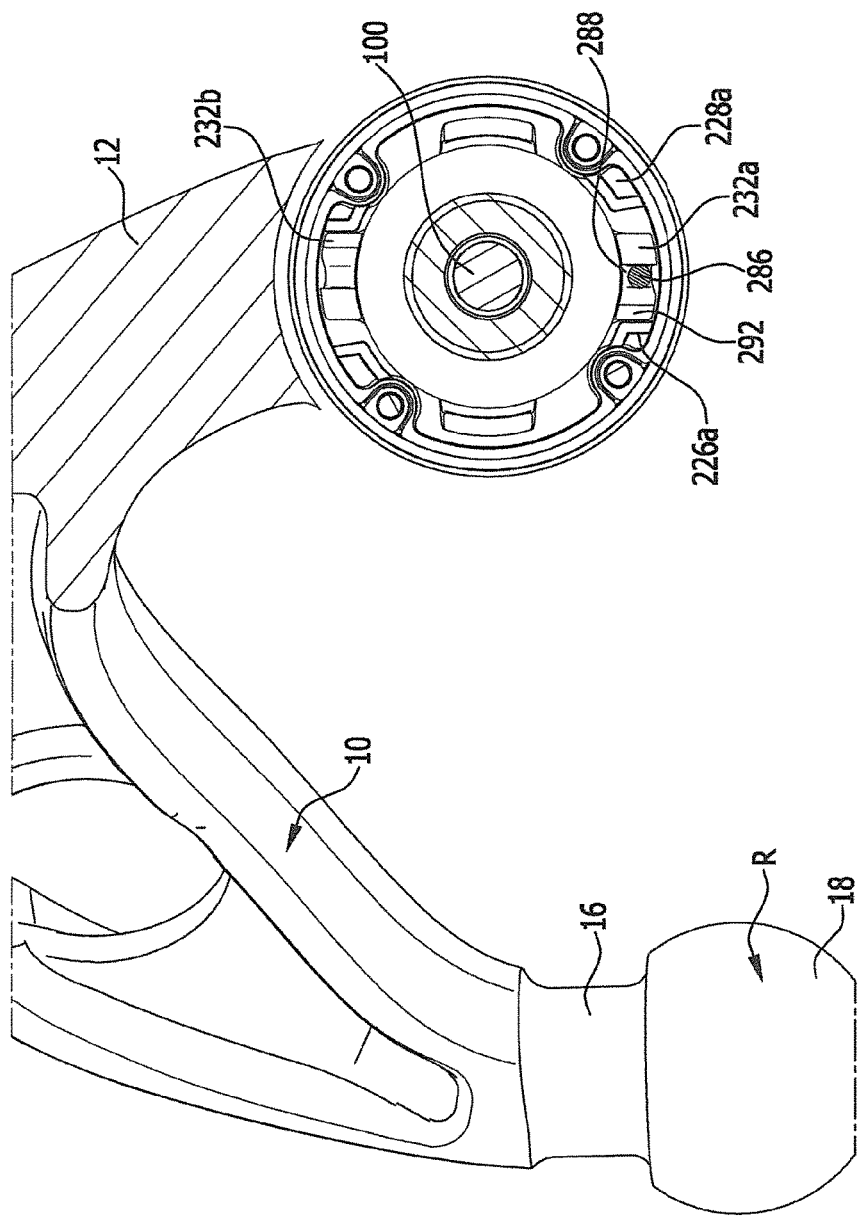

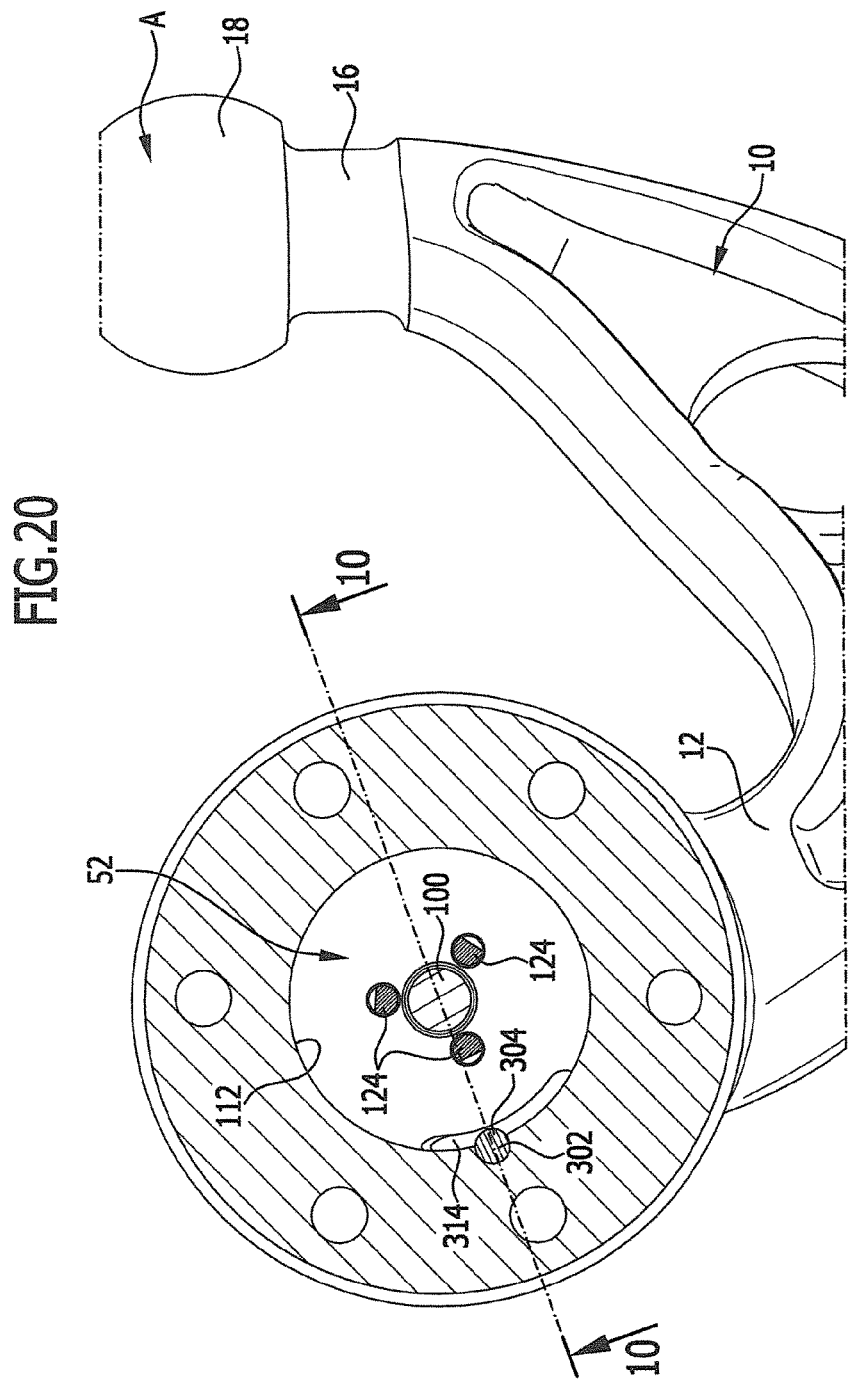

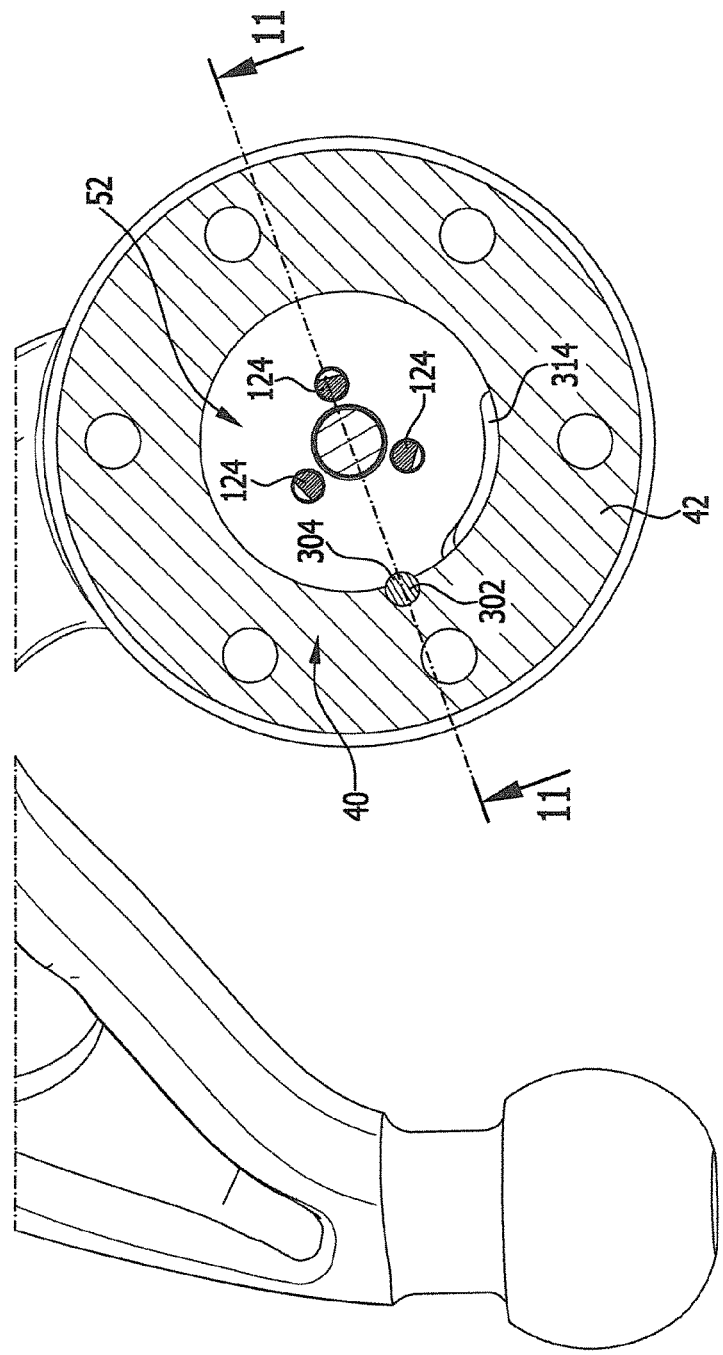

TRAILER COUPLING

CROSS-REFERENCE TO RELATED PATENT APPLICATIONS

This patent application claims the benefit of German application No. 10 2015 115 357.2, filed Sep. 11, 2015, the teachings and disclosure of which are hereby incorporated in their entirety by reference thereto.

BACKGROUND OF THE INVENTION

The invention relates to a trailer coupling including a ball neck, which is movable between an operative position and a rest position and which has a pivot bearing body arranged at a first end and a coupling ball arranged at a second end, a pivot bearing unit, which is arranged fixed to the vehicle and by means of which the pivot bearing body is received such that it is pivotal about the pivot axis between the operative position and the rest position, and a rotation blocking arrangement having at least two rotation blocking bodies, which are guided by means of a guide body to be movable in a guide direction having at least one component in the radial direction relative to the pivot axis, wherein, in the operative position, the rotation blocking bodies are movable into a rotation blocking position by a movement in the guide direction and, in this rotation blocking position, engage with a receptacle in the pivot bearing body in order to block a pivotal movement of the pivot bearing body about the pivot axis relative to the guide body, and are movable into a release position and, in this release position, are not in engagement with the respective receptacle, and having an actuating body which has a respective cam face, that runs transversely to the guide direction, for each of the rotation blocking bodies and which is arranged to be rotatable about the pivot axis and as a result of the rotary movement whereof in a direction of actuation the at least two rotation blocking bodies are movable and urgeable in the guide direction.

Trailer couplings of this kind are known for example from EP 1 741 572 A1.

However, in trailer couplings of this kind a fundamental problem is to make them as compact and as structurally simple as possible so that they can also be used in restricted spatial conditions.

SUMMARY OF THE INVENTION

This object is achieved according to the invention in the case of a trailer coupling of the type described in the introduction in that a release position latching arrangement is provided which, in a release position of the actuating body, is movable between a latch release position that allows movement of the actuating body in relation to the guide body and a latching position that fixes the actuating body in relation to the guide body, and which is urged in the direction of the latching position by a spring element, at least in the release position of the actuating body.

By means of a release position latching arrangement of this kind, it is possible in a simple manner to maintain the release position of the actuating body during movement of the ball neck and hence to maintain the rotary movement of the pivot bearing body from the operative position into the rest position in the release position.

With the solution according to the invention, there is in particular the possibility of rotating the pivot bearing body without the latter being urged in any way by the rotation blocking bodies, and moreover there is the possibility of using the rotation blocking arrangement for example only to fix the pivot bearing body in the rotary position that corresponds to the operative position of the ball neck.

Further, with the solution according to the invention there is the possibility of constantly urging the rotation blocking body by means of a force, for example the force of a spring, such that it tends to move into the rotation blocking position, such that this action of a force on the actuating body may also be present when the latter is in the release position, since the latching arrangement in the release position prevents the actuating body from performing a rotary movement because of urging by the force.

In particular, with the solution according to the invention, it is provided for the release position latching arrangement in the release position of the actuating body to change over to the latching position automatically once the pivot bearing body has left the rotary position that corresponds to the operative position.

In particular, with the solution according to the invention, it is provided, once at least one functional position of the trailer coupling has been reached, for the release position latching arrangement to change over from the latching position to the latch release position and thus in turn to allow movement of the actuating body, in particular in the direction of the rotation blocking position thereof.

In particular in this case, the functional position does not correspond to the rest position of the trailer coupling but is a position including the operative position.

In the simplest case, the functional position is that of the operative position of the trailer coupling, so it is ensured that the release position latching arrangement can always change over from the latching position to the latch release position when it is in the operative position, and thus the rotation blocking arrangement can be active in the operative position.

In this case, the change-over from the latching position to the latch release position could be performed by detection of the most diverse variables affecting functioning of the trailer coupling.

For example, the position of the ball neck, in particular the operative position of the ball neck, could be detected electronically and then the change-over of the release position latching arrangement from the latching position to the latch release position could be initiated electronically.

The individual functional positions of the trailer coupling can be detected in a particularly simple manner in that a rotary position of the pivot bearing body is detected such that the release position latching arrangement changes over from the latching position to the latch release position in dependence on at least one particular rotary position of the pivot bearing body.

It is particularly advantageous in this case if, once at least one predetermined rotary position of the pivot bearing body has been reached, the release position latching arrangement changes over from the latching position to the latch release position, that is to say that it is thereby possible to establish in a simple manner the rotary position of the pivot bearing body at which the release position latching arrangement is to change over from the latching position to the latch release position.

As regards functional reliability, it has proved particularly favourable if, once the at least one predetermined rotary position of the pivot bearing body has been reached, the release position latching arrangement changes over from the latching position to the latch release position by mechanical control.

The mechanical control of the change-over from the latching position to the latch release position has the result of ensuring a particularly high degree of functional reliability, since an essential safety aspect thereof is that the rotation blocking arrangement in the operative position always automatically changes over to the rotation blocking position and remains there.

More detailed statements have not yet been made as regards the construction of the release position latching arrangement in particular.

For example, an advantageous embodiment provides for the release position latching arrangement to include a latching body that is guided in a latching direction in one of the bodies, and a latching receptacle that is provided in the other of the bodies and in which the latching body engages in the latching position and from which it is disengaged in the latch release position.

A mechanical solution of this kind is on the one hand simple to construct and on the other extremely compact.

It is particularly favourable if the latching body is arranged such that it is guided in the latching direction in the actuating body, and the latching receptacle is arranged in the guide body.

So that the rotary positions of the pivot bearing body can be detected in the case of a mechanical construction of this kind, it is preferably provided for a sensor body to be arranged in the latching receptacle, and for this sensor body to detect the presence of rotary positions of the pivot bearing body in relation to the guide body and thus to be able to recognise mechanically the rotary positions of the pivot bearing body in relation to the guide body.

In particular, this can advantageously be achieved in that the sensor body uses a sensor head to scan a contour that is arranged on the pivot bearing body and is movable with the pivot bearing body, to detect the individual rotary positions of the pivot bearing body.

So that, once the desired rotary positions have been reached, the latching body can then be moved from the latching position to the latch release position in a simple manner, it is preferably provided, in at least one predetermined rotary position of the pivot bearing body, for the sensor body to displace the latching body from the latching receptacle and thus to move it from the latching position to the latch release position.

More detailed statements have not yet been made as regards the direction in which the latching body is latched.

For example, the latching body and the latching receptacle could be aligned such that the direction of latching runs radially in relation to the pivot axis.

However, a structural solution that is particularly favourable from the point of view of construction provides for the latching body to be movable in a latching direction that runs parallel to the pivot axis.

Moreover, the object mentioned in the introduction is achieved according to the invention as an alternative or in addition to the solutions described above in that there is provided a rest position latching arrangement that is independent of the rotation blocking arrangement and that, in a free-movement position, permits movement of the pivot bearing body in relation to the guide body and, in a rest position latching position, fixes the pivot bearing body such that it is fixed in rotation relative to the guide body and, at least in the rotary position of the pivot bearing body that corresponds to the rest position, changes over to the latching position automatically.

The advantage of the solution according to the invention can be seen in the fact that, with this, the ball neck can be fixed in the rest position independently of the rotation blocking position, and the rotation blocking position can be set up primarily for the loads in the operative position, whereas the loads in the rest position of the ball neck are much smaller and thus the rest position latching arrangement can also be set up accordingly in a correspondingly simpler manner.

In principle, it would be conceivable to construct the rest position latching arrangement such that they automatically, for example electrically, trigger latching once the rest position is reached.

In order to make latching as functionally reliable as possible, it is preferably provided, once the rotary position of the pivot bearing body that corresponds to the rest position has been reached, for the rest position latching arrangement to change over to the latching position automatically, as a result of a spring element provided therein, such that there is no need for actuation of a latching element required by a control, but a mechanically automatic function of the rest position latching arrangement that ensures a high degree of reliability is provided.

So that the rest position latching arrangement can be suitably moved from the rest position latching position into the free-movement position, it is preferably provided for the rest position latching arrangement to be releasable in dependence on a particular functional condition of the trailer coupling.

For example, the functional condition of the trailer coupling is a control command for pivoting the ball neck from the rest position into the operative position, or indeed already the start of pivoting of the ball neck from the rest position into the operative position.

So that the change-over of the rest position latching arrangement from the rest position latching position into the free-movement position can be brought about in a simple manner, it is provided for the rest position latching arrangement to be releasable at the start of pivoting of the pivot bearing body from the rest position into the operative position.

In this case, an advantageous solution provides for the rest position latching arrangement to be changeable from the rest position latching position to the free-movement position by an electrically operable drive unit.

For example, a drive unit of this kind could act directly on a latching body of the rest position latching arrangement in order to move the latching body from the rest position latching position into the free-movement position.

A particularly advantageous solution provides for a drive unit, which is provided for pivoting the ball neck, to change the rest position latching arrangement over to the free-movement position by way of a pivot drive for the ball neck.

The advantage of this solution can be seen in the fact that it can be ensured in a simple manner, by way of the pivot drive, that the rest position latching arrangement is changed over from the rest position into the free-movement position only once the pivot bearing body and hence the ball neck have started pivoting.

In this case, a particularly simple solution provides for the pivot drive to change over the rest position latching arrangement to the free-movement position before pivoting of the pivot bearing body.

More detailed statements have not yet been made as regards the construction of the rest position latching arrangement.

For example, a particularly simple solution provides for the rest position latching arrangement to include a latching body that is arranged in one of the bodies, is movable in a latching direction and is engageable with a latching receptacles that is arranged in another of the bodies.

This solution does not require additional overall space and thus enables the rest position latching arrangement to be constructed particularly simply.

The construction of the rest position latching arrangement is particularly simple if the latching body that is movable in the latching direction is arranged in the carrying body and the latching receptacle is arranged in the pivot bearing body.

In conjunction with the exemplary embodiments above, likewise, more detailed statements have not yet been made as regards the orientation of the latching direction.

For example, an advantageous solution provides for the latching direction to run parallel to the pivot axis.

So that the latching body can be moved from the rest position latching position to the free-movement position mechanically in a particularly simple manner, it is preferably provided for there to be associated with the latching receptacle a latching release body which, on actuation, displaces the latching body from the latching receptacle and thus changes it over to the free-movement position.

As regards actuation of the latching release body, it is particularly favourable if the latching release body is actuable by a pivot drive for the pivot bearing body.

In this context, a solution that is particularly favourable in respect of its simplicity provides for the pivot drive for pivoting the pivot bearing body from the rest position into the operative position first to be movable freely relative to the pivot bearing body and then to pivot the pivot bearing body between the rest position and the operative position.

In particular during this, the rest position latching arrangement is changed over by the pivot drive during free movement from the rest position latching position to the free-movement position.

It is advantageous if the rotation blocking arrangement includes at least three rotation blocking bodies.

A particularly favourable solution provides for the rotation blocking bodies to be arranged relative to the actuating body such that at least their reaction forces that are directed transversely to the pivot axis and act on the actuating body are compensated, at least in part.

In a solution of this kind, there is thus the advantage that the actuating body need not be constructed such that it must be mounted stably for taking up the reaction forces of the rotation blocking bodies that act thereon but may be mounted very simply if the reaction forces of the rotation blocking bodies that act on the actuating body at least partly cancel each other out.

In this case, it is particularly advantageous if the rotation blocking bodies are arranged relative to the actuating body such that at least their reaction forces that are directed transversely to the pivot axis and act on the actuating body substantially cancel each other out.

It is particularly advantageous if the rotation blocking bodies are arranged relative to the actuating body such that their reaction forces acting on the actuating body at least partly cancel each other out.

In principle, in this case the rotation blocking bodies may be arranged in any desired manner relative to the actuating body.

One exemplary embodiment provides for the rotation blocking bodies to be arranged around the actuating body. With a solution of this kind, on the one hand a compact arrangement of the rotation blocking bodies is possible and on the other there is an at least partial compensation of the reaction forces acting on the actuating body.

An arrangement of this kind is particularly favourable if the rotation blocking bodies are arranged substantially symmetrical to a plane running perpendicular to the pivot axis.

In order to achieve rotational fixing of the pivot bearing body which as far as possible is without play, it is preferably provided for at least two of the rotation blocking bodies to cooperate with the receptacles provided therefor such that they produce torque forces, acting in opposition to one another, on the pivot bearing body.

Because of these two torque forces acting in opposition to one another, it is possible to fix the pivot bearing body without play using the pivot bearing unit.

It is particularly favourable if the actuating body has cam faces that extend over an angular region about the pivot axis and vary in respect of their radial spacing from the pivot axis, and by means of which the rotation blocking bodies are urgeable.

Moreover, more detailed statements have not yet been made, as part of the description of the solution according to the invention, as regards how the rotation blocking bodies are themselves to be guided in the guide direction.

For example, it would be conceivable for a guide receptacle in the pivot bearing body to guide the rotation blocking body and for immovable receptacles to be provided by means of which the at least one rotation blocking body is engageable or disengageable.

However, it is particularly advantageous if a guide body that adjoins the pivot bearing body in the radial direction guides the rotation blocking body.

Preferably in this case, the guide body is constructed such that it has a guide sleeve with the guide receptacle for the respective rotation blocking body.

A guide body provided in this way can also advantageously be used in particular for the purpose of connecting a bearing for the actuating body to the guide body such that the actuating body can thus be mounted simply and favourably.

More detailed statements have not yet been made as regards the mounting of the pivot bearing body itself in the pivot bearing unit either.

For example, in particular a favourable solution provides for the guide body to form a pivot bearing for the pivot bearing body such that the guide body here, in addition to the function of guidance, also has the advantage of taking on the mounting function for the pivot body.

Advantageously in this case, the guide body is arranged such that it is part of the pivot bearing unit, which is arranged fixed to the vehicle.

In the context of the solution according to the invention, different possibilities for the relative arrangement of the guide body, the pivot bearing body and the actuating body are conceivable.

For example, a solution would be conceivable in which the actuating body surrounds the guide body and the pivot bearing body is surrounded by the guide body, that is to say engages in the guide body.

However, a further advantageous solution provides for the actuating body to be surrounded by the guide body, and for the pivot bearing body to embrace the guide body.

For a construction that is as simple as possible, it is advantageous if the pivot bearing body forms an external body which surrounds the pivot bearing unit on the outside and which is arranged to be non-displaceable in the direction of the pivot axis in relation to the pivot bearing unit and the guide body.

An arrangement of the pivot bearing body of this kind on the one hand has the advantage of a favourable spatial setup of the pivot bearing unit itself, and the advantage of relative simple sealing of the pivot bearing unit, since the pivot bearing body does not perform any movements in the axial direction of the pivot axis.

Preferably, seals that are peripheral in relation to the pivot axis are provided between a housing of the pivot bearing unit and both end faces of the external body, and these provide a seal to prevent the ingress of dirt and moisture.

As regards the stability and also the compactness of the trailer coupling according to the invention, a particularly favourable exemplary embodiment provides for the first end of the ball neck to be attached to the external body.

In this way, a particularly simple and stable connection can be made between the pivot bearing body and the ball neck, likewise without taking up additional overall space.

Further, the construction of the trailer coupling is particularly compact if the pivot bearing body forms an external body which surrounds the rotation blocking arrangement on the outside and which is arranged to be non-displaceable in the direction of the pivot axis in relation to the guide body.

In a favourable solution, it is provided for the rotation blocking bodies to be movable from a release position into a rotation blocking position by the actuating body.

Preferably in this case, the actuating body is constructed such that in the release position it permits the release position of the rotation blocking bodies.

In particular, a further construction of the actuating body provides for the latter, in the rotation blocking position, to keep the rotation blocking bodies in their rotation blocking position.

In order to ensure that the rotation blocking bodies always change over to their rotation blocking position, in particular if there is no actuation of the actuating body, it is preferably provided for the actuating body to be urged in the direction of its rotation blocking position by an elastic energy store, in particular a torsional spring.

An elastic energy store of this kind could in principle be arranged at a plurality of locations.

From a construction point of view, it is particularly favourable if the elastic energy store is arranged within the carrying body.

A further solution that is favourable from a construction point of view provides for the elastic energy store to be arranged on one side of the actuating body.

In this case, the elastic energy store can advantageously be coupled to the actuating element.

So that the actuating body can be suitably actuated, an actuating arrangement is preferably provided by means of which the actuating body is movable from the rotation blocking position into the release position.

Favourably in this case, the actuating arrangement is constructed such that the actuating body is movable thereby in opposition to the urging of the energy store.

In the case of an actuating body that is provided to be rotatable, it is provided for the actuating body to be twistable by means of the actuating arrangement in opposition to the direction of rotation brought about by the energy store.

More detailed statements have not yet been made as regards the construction of the actuating arrangement. For example, an advantageous solution provides for the actuating device to have a drive element that is coupled to the actuating body.

A coupling of this kind between the drive element and the actuating body may be constructed in the most diverse ways. One solution would be a direct connection between the drive element and the actuating body.

However, it is particularly advantageous if the drive element and the actuating body are coupled to one another by way of an entrained coupling arrangement.

An entrained coupling arrangement of this kind may be constructed in the most diverse ways. One advantageous embodiment provides for the entrained coupling arrangement to have a free-running condition, which is free of entrainment, and an entraining condition.

One embodiment of a trailer coupling according to the invention provides for the entrained coupling arrangement to be constructed such that movement of the drive element from a starting position only brings about a movement of the actuating body after a free-running condition has been passed through and an entraining condition has been reached in an intermediate position.

In the context of the solutions above, the drive of the rotation blocking arrangement, which enables the rotation blocking arrangement to be changed over from at least one rotation blocking position to a free-running position and vice versa, has only been explained in general terms.

In this context, it is advantageous if a motorised drive is provided for actuation of the rotation blocking arrangement.

Further, it is advantageous if a motorised drive is provided as a pivot drive for performing the pivotal movement of the pivot bearing body.

For example, it is conceivable to provide two motorised drives, wherein one motorised drive is provided for actuating the rotation blocking arrangement and one motorised drive is provided for performing the pivotal movement of the pivot bearing body.

In particular, since driving the rotation blocking arrangement always takes place at times during which no pivotal movement of the pivot bearing body is to take place, and on the other hand pivotal movement of the pivot bearing body always takes place when no driving of the rotation blocking arrangement is required, it is conceivable to provide a switch-over arrangement which switches over a supplied drive power, for example from an electrical source, alternately from one drive to the other drive, such that the drive output that is made available from a separate supply arrangement—for example on the vehicle—can be utilised either for actuating the rotation blocking arrangement or for pivoting the pivot bearing body. In this case, however, a corresponding sensor system has to detect when the rotation blocking arrangement is in the rotation blocking position or the free-running position and when the pivot bearing body is in the position corresponding to the operative position or the position corresponding to the rest position, and switch the drive output over from one drive to the other in a manner corresponding to the positions detected by the sensor system.

In the case of a drive of the rotation blocking arrangement that is independent of the drive for the pivotal movement of the pivot bearing body, there is the problem that in the event of a malfunction the difficulty arises of identifying unambiguous starting positions for both the pivotal movement of the pivot bearing body and the rotation blocking arrangement.

As an alternative or in addition to the solutions described above, an advantageous solution thus provides for the drive for the rotation blocking arrangement and the drive for the pivotal movement of the pivot bearing body to be coupled by a planetary gearing mechanism.

A planetary gearing mechanism of this kind enables the two movements to be coupled to one another.

A planetary gearing mechanism of this kind in which the planetary gearing mechanism is drivable by a single motorised drive is particularly suitable.

Preferably, in this case, the planetary gearing mechanism is integrated between a power take-off for actuating the rotation blocking arrangement and a power take-off for performing the pivotal movement of the pivot bearing body such that the planetary gearing mechanism enables a change-over to be made between driving the rotation blocking arrangement and pivotal movement of the pivot bearing body.

Driving of the different functions of the trailer coupling according to the invention is possible in a particularly advantageous manner if a planetary gearing mechanism that is driven by a motorised drive unit is provided and if a power take-off of the planetary gearing mechanism acts as an actuator on the actuating body in order to move the latter from the rotation blocking position into the release position and/or where appropriate vice versa, and if another power take-off of the planetary gearing mechanism acts as a pivotal drive on the pivot bearing body for pivoting the ball neck between the operative position and the rest position.

The advantage of using a planetary gearing mechanism can be seen in the fact that a planetary gearing mechanism of this kind permits a change-over from one power take-off to the other power take-off in a simple manner and thus one drive unit, including for example an electric drive motor and where appropriate a gearing mechanism, is sufficient to drive alternately by way of the one power take-off the movements of the actuating body and by way of the other power take-off the pivotal movement of the ball neck between the operative position and the rest position.

For example, it is provided for a sun gear of the planetary gearing mechanism to be drivable by the motorised drive.

Further, it is advantageously provided for a ring gear of the planetary gearing mechanism to be coupled to the power take-off for the rotation blocking arrangement.

Further, it is advantageously provided for a planet gear carrier of the planetary gearing mechanism to be coupled to the power take-off for the pivotal movement.

In order, in the case of a planetary gearing mechanism that is driven by a single motorised drive, to drive either the rotation blocking arrangement or the pivotal movement, it is advantageously provided for driving of the pivotal movement or the rotation blocking arrangement to be performed in dependence on restraint of driving the rotation blocking arrangement or the pivotal movement.

Restraint of the pivotal movement or of the rotation blocking arrangement of this kind is producible in the most diverse ways.

Restraint of the pivotal movement is producible in a simple manner in that the pivotal bearing part is lockable relative to the guide body, such that when the pivotal bearing part is locked the pivotal movement is necessarily restrained.

Restraint of driving the rotation blocking arrangement can be produced in the most diverse ways.

A particularly favourable solution in this context provides for the release position latching arrangement to be provided for restraint of driving the rotation blocking arrangement.

No more detailed statements of any kind have yet been made as regards the arrangement of the planetary gearing mechanism in relation to the other components of the trailer coupling.

For example, an advantageous solution provides for the planetary gearing mechanism to be arranged coaxially in relation to the pivot axis.

A solution of this kind is on the one hand particularly compact and on the other enables simple integration of the planetary gearing mechanism into the trailer coupling according to the invention.

In this context, it is particularly advantageous if the planetary gearing mechanism is arranged on a side of the actuating element facing the motorised drive in order in this way to enable the planetary gearing mechanism to be used in a simple manner for driving the actuating element.

In particular, it is favourable in this context if, as seen in the direction of the pivot axis, the planetary gearing mechanism is driven by the motorised drive on one side and has a power take-off for the actuating element on the opposite side.

A solution that is particularly advantageous from the point of view of construction provides for the planetary gearing mechanism to be arranged, as seen in the direction of the pivot axis, between the motorised drive and the actuating element.

As regards the arrangement of the various components of the trailer coupling according to the invention, it has proved particularly advantageous if the planetary gearing mechanism, the elastic energy store and the actuating element are arranged one after the other, as seen in the direction of the pivot axis.

A further advantageous solution thus provides for the actuating body to be blockable by a securing arrangement.

Particularly advantageous is a solution in which the actuating body is blockable by the securing arrangement to prevent it from reaching its inactive position, in order to ensure that the actuating body never by itself permits the rotation blocking bodies to adopt their release position, for example if there is a rupture in the elastic energy store urging the actuating body in the direction of its active position.

A securing arrangement of this kind is constructed such that it requires an action in order to cancel blocking of the actuating body.

For this reason, it is advantageously provided for the actuating device to be coupled to the securing arrangement such that, by way of the actuating device, release of blocking of the actuating body can also be cancelled by the securing arrangement.

Preferably in this case, the securing arrangement is coupled to the actuating device such that the securing arrangement blocks a movement of the actuating body that is not triggered by actuation.

In particular, the securing arrangement is constructed such that if the actuating device is not actuated it blocks movement of the actuating body into its release position.

In this context, an advantageous solution provides for the drive element of the actuating device, for example the power take-off element of the planetary gearing mechanism, to be coupled to the securing arrangement.

Advantageously in this context, the drive element, for example the power take-off element of the planetary gearing mechanism, can be constructed such that the action on the actuating body and the action on the securing arrangement are adapted to one another by way of the drive element, such that actuation of the actuating device on the one hand results in cancellation of blocking of the actuating body and on the other results in the actuating body being moved from the active position into the inactive position.

For example, for this purpose it is provided for the drive element, in the course of its movement from the starting position to an intermediate position, to change the securing arrangement over from the securing position into the unsecured position.

As regards the coupling between the drive element and the securing arrangement, the most diverse possibilities are conceivable.

For example, any type of coupling, for example including one by way of an electrical control, would be conceivable.

In this context, a solution that is particularly advantageous because of its simplicity provides for the drive element and the securing arrangement to be coupled to one another by way of a mechanical coupling arrangement.

The mechanical coupling arrangement is favourably constructed such that it controls the action on the securing arrangement by means of a slideway.

Further features and advantages of the solution according to the invention form the subject matter of the description below and the illustrative drawing of an exemplary embodiment.

BRIEF DESCRIPTION OF THE DRAWINGS

FIG. 17 shows a section along the line 17-17 in FIG. 5;

FIG. 18 shows a section along the line 18-18 in FIG. 17;

FIG. 20 shows a section along the line 20-20 in FIG. 10; and

FIG. 21 shows a section along the line 21-21 in FIG. 11.

DETAILED DESCRIPTION OF THE INVENTION

Figure 1:
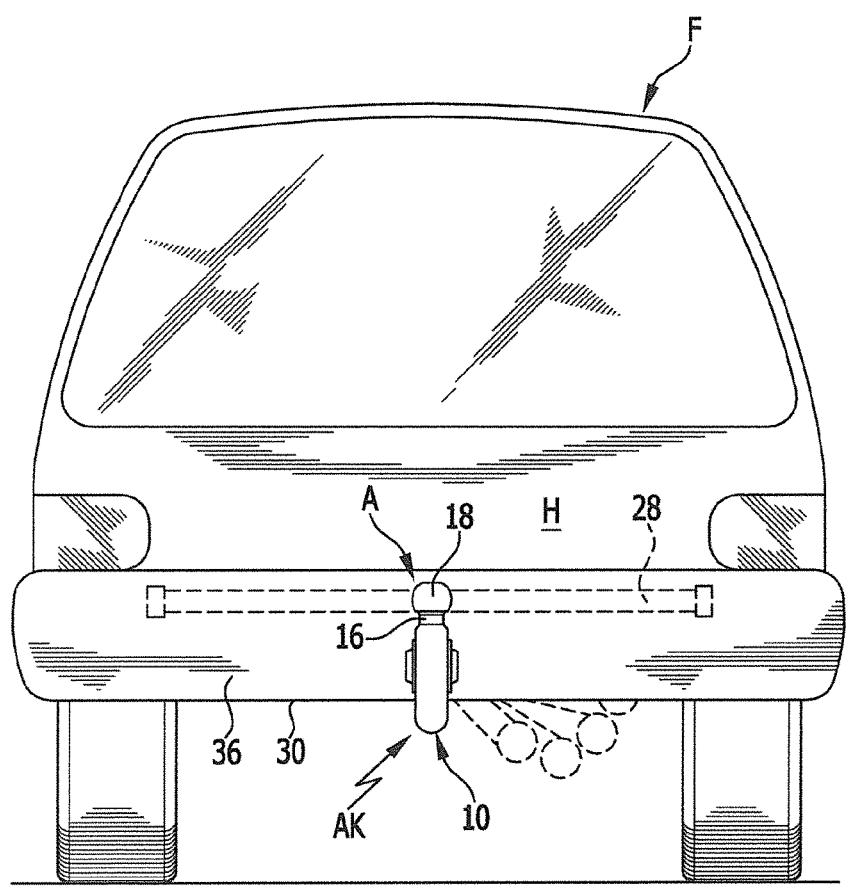
FIG. 1 shows a rear view of a motor vehicle having a trailer coupling according to the invention.
Figure 2:
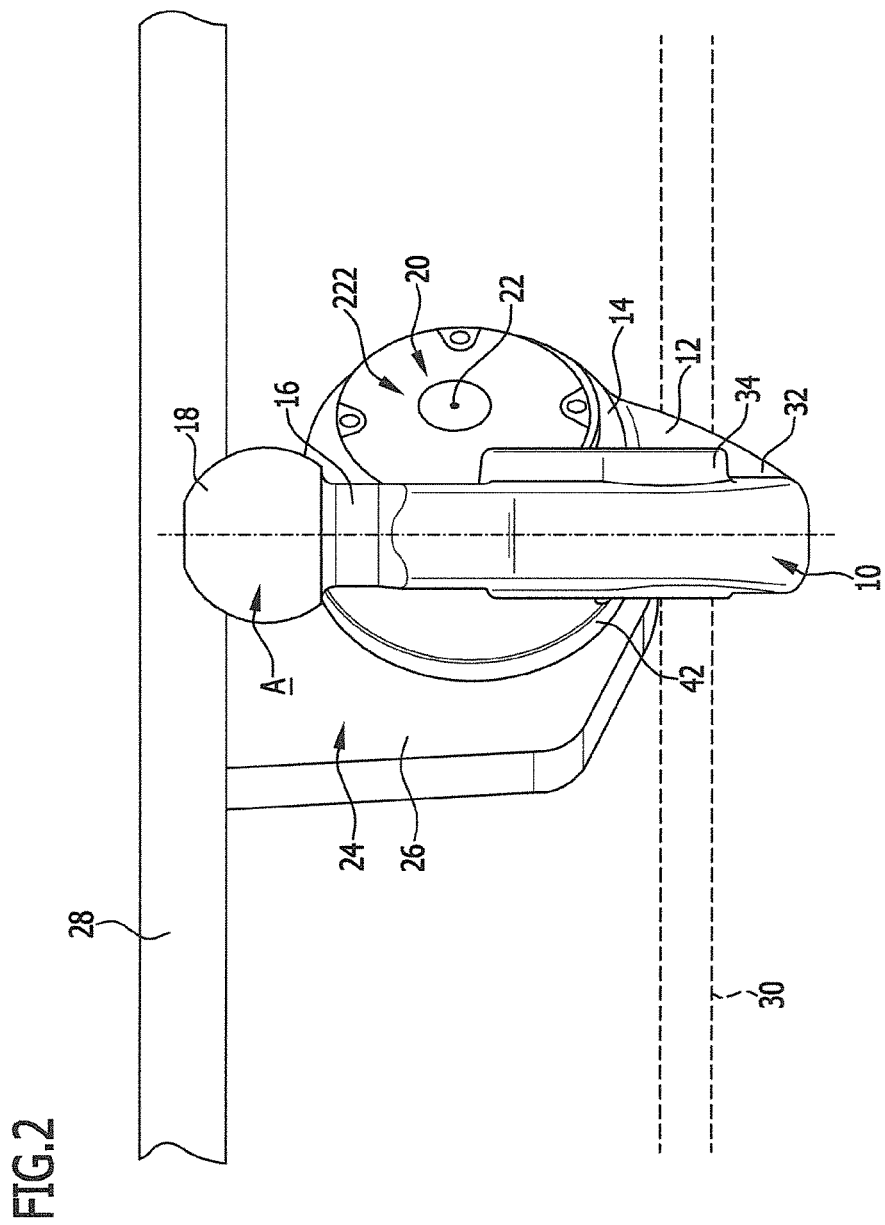
FIG. 2 shows a plan view of a first exemplary embodiment of a trailer coupling according to the invention, with the trailer coupling, which is mounted on a vehicle rear, viewed in the direction of travel, the trailer coupling being in its operative position.
Figure 3:
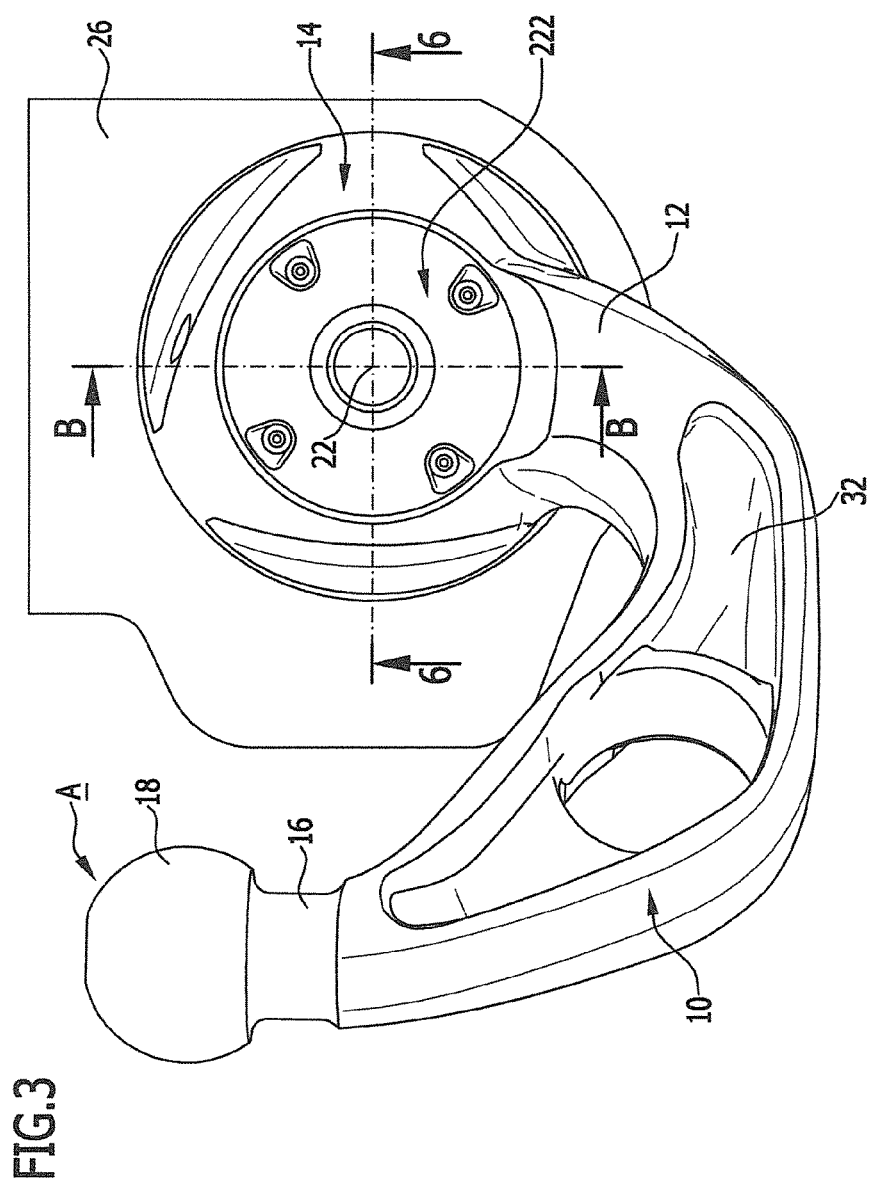
FIG. 3 shows a plan view of the trailer coupling in FIG. 2, in the direction of the pivot axis.
Figure 4:
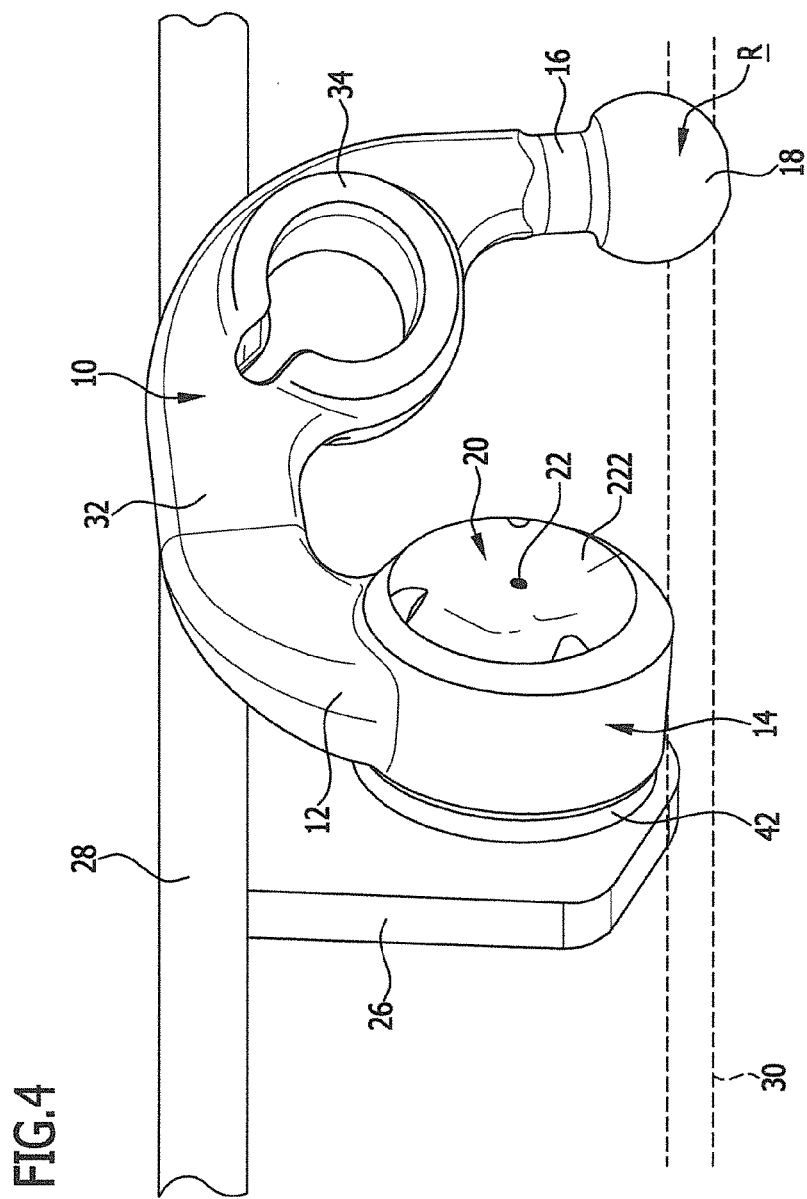
FIG. 4 shows a view corresponding to FIG. 2, of the trailer coupling in the rest position.
Figure 5:
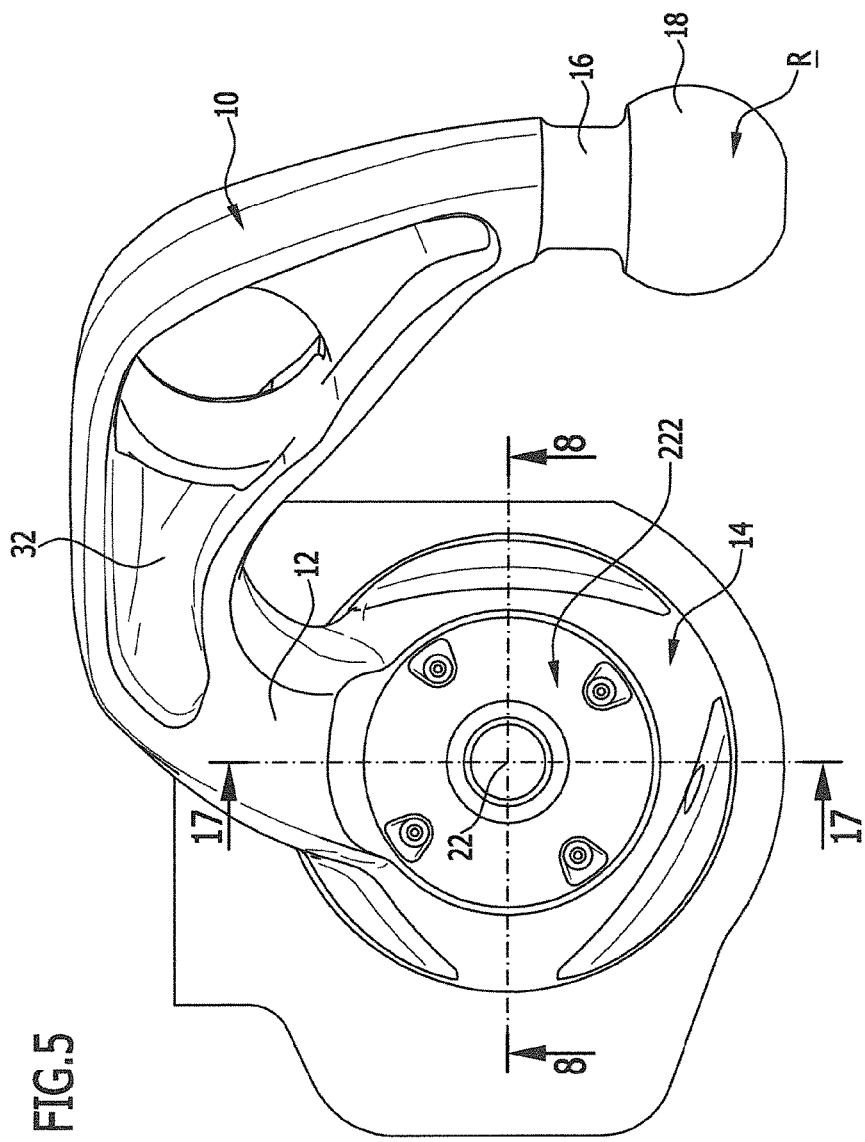
FIG. 5 shows a plan view of the trailer coupling in the rest position in FIG. 4, in the direction of the pivot axis.

A first exemplary embodiment of a trailer coupling AK according to the invention for a motor vehicle, illustrated in FIGS. 1, 2 and 3 in an operative position A and in FIGS. 4 and 5 in a rest position R, includes a ball neck, which is designated 10 as a whole and is held at a first end 12 on a pivot bearing body 14 and carries at a second end 16 a coupling ball that is designated 18 as a whole, wherein a coupling ball receptacle of a trailer is fixable to the coupling ball.

The pivot bearing body 14 is mounted to pivot, in relation to a carrier 24 that is fixed to the vehicle, about a pivot axis 22 by means of a pivot bearing unit that is designated 20 as a whole, wherein the carrier 24 preferably has a carrier plate 26, which holds the pivot bearing unit 20 and preferably extends in a plane perpendicular to the pivot axis 22, and a transverse carrier 28, which is fixed to the vehicle and is securable in known manner to a rear region H of a vehicle body F in such a way that the pivot bearing unit 20 and the carrier 24 lie on a side of a lower edge 30 of a bumper unit 36 that is remote from the carriageway surface and are covered by the bumper unit 36 (FIG. 2).

In the operative position, which is illustrated in FIGS. 1 and 2, a portion 32 of the ball neck 10 that adjoins the first end 12 extends underneath the lower edge 30 of the bumper unit 36, such that the second end 16 and the coupling ball 18, together with a power socket receptacle 34, are located on a side of the rear bumper unit 36 that is remote from the vehicle body, while in the rest position both the pivot bearing unit 20 and the entire ball neck 10, together with the coupling ball 18, are hidden from sight from behind by the rear bumper unit 36.

As illustrated in FIGS. 6 to 9, the pivot bearing unit 20 includes a guide body 40, which is fixedly connected to the carrier plate 26 by means of a flange 42, and a guide sleeve 44 which, starting from the flange 42, extends away from the carrier plate 26 and on which the pivot bearing body 14 is rotatably mounted.

For this purpose, the guide sleeve 44 includes a cylindrical outer face 46 against which the pivot bearing body 14 abuts by means of a cylindrical inner face 48 and hence undergoes, about the pivot axis 22, a rotary guidance about the axis 22, such that the pivot bearing body 14 is rotatable in relation to the guide body 40 such that the ball neck 10 is pivotal from the operative position A into the rest position R and vice versa.

Thus, as a result of its fixed connection with the carrier plate 26 and the carrier 24, the guide body 40 forms the rotary mounting, which is fixed to the vehicle, for the pivot bearing body 14.

To fix the pivot bearing body 14 in the operative position A, the pivot bearing unit 20 is provided with a rotation blocking arrangement, which is designated 50 as a whole and which an actuating body 52, a plurality of rotation blocking bodies 54 that are urgeable by the actuating body 52 and are movably guided in guide receptacles 56 of the guide sleeve 44 in a guide direction 58 that extends substantially radially in relation to the pivot axis 22, and, starting from the inner face 48 of the pivot bearing body 14, receptacles 60 that extend thereinto and by means of which the rotation blocking bodies are engageable in the operative position A, wherein the receptacles 60 have wall faces which are at an increasingly small spacing from one another in the radial direction in relation to the pivot axis 22.

If for example, as illustrated in connection with FIG. 7 and FIG. 9 in the first exemplary embodiment, the rotation blocking arrangement 50 includes a set of three rotation blocking bodies 54a, 54b and 54c, the guide sleeve 44 has a corresponding set of three guide receptacles 56a, 56b and 56c in which the rotation blocking bodies 54a, 54b and 54c are displaceably guided in the guide direction 58, which extends substantially radially in relation to the pivot axis 22, and the pivot bearing body 14 is provided with a set of first receptacles 58a, 58b and 58c by means of which the rotation blocking bodies 60a, 60b and 60c are engageable in the operative position A.

For suitably moving and positioning the rotation blocking bodies 54 in the guide direction 57, the actuating body 52 is provided with a set, corresponding to the number of rotation blocking bodies 54, of a total of three retraction receptacles 62a, 62b and 62c and three pressure faces 66a, 66b and 66c that adjoin the retraction receptacles 62a, 62b and 62c in a direction of revolution 64 and are constructed as cam faces acting radially in relation to the pivot axis 22, wherein, in their release position, the rotation blocking bodies 54 can penetrate far enough into the retraction receptacles 62a, 62b, 62c to no longer project beyond the external outside face 46 of the guide sleeve 44, and wherein the pressure faces 66a, 66b, 66c each extend outwards, from a radially inner starting region 68a, 68b and 68c that directly adjoins the respective retraction receptacles 62, increasingly radially in relation to the pivot axis 22 as their extent in the direction 64 of revolution increases, as far as a respective radially outer end region 70a, 70b and 70c and thus act on the rotation blocking bodies 54 as cam faces in the event of rotary movement of the actuating body 52 in order to move the rotation blocking bodies 54 into their rotation blocking position.

Preferably, in so doing the pressure faces 66 extend in the form of spiral or involute segments in relation to the pivot axis 22.

Figure 9:
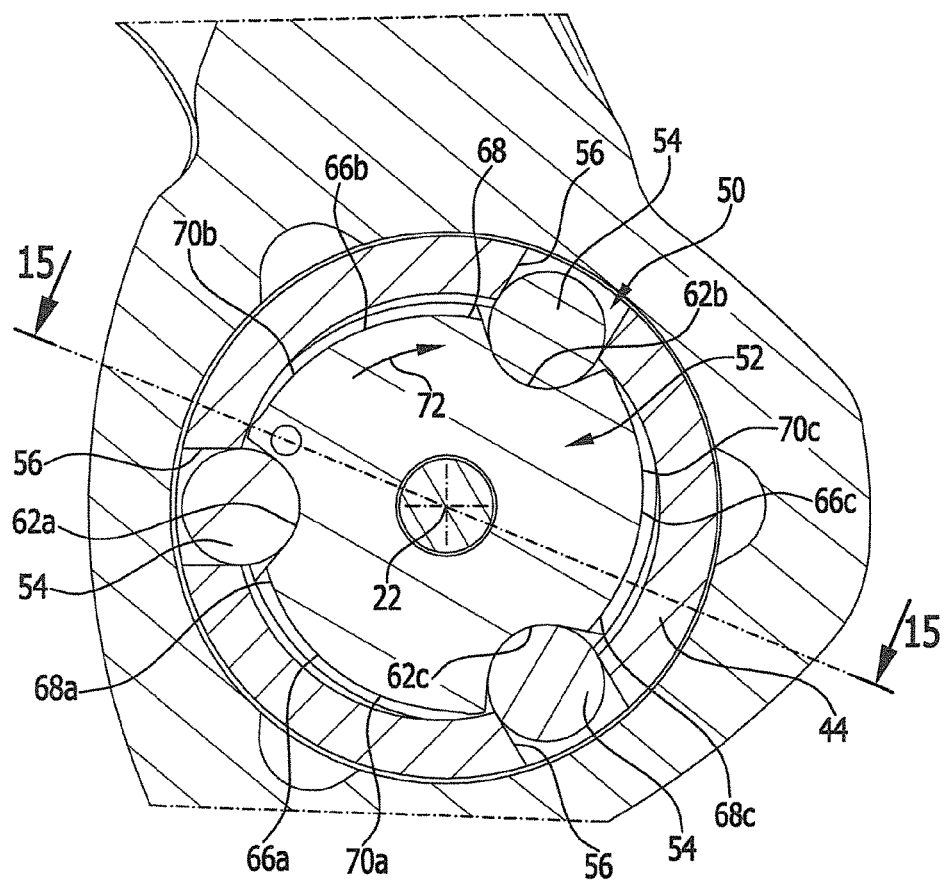
FIG. 9 shows a section along the line 9-9 in FIG. 8.

So that the rotation blocking bodies 54 are either kept in their rotation blocking position as a result of being urged by the pressure faces 66 between the starting region 68 and the end region 70, or allowed to penetrate into the retraction receptacle 62 in the release position, the actuating body 52 is likewise rotatable about the pivot axis 22, in particular coaxially thereto, such that either the set of retraction receptacles 62a, 62b and 62c faces the rotation blocking bodies 54 and in its inactive position, as illustrated in FIG. 9, provides them with the possibility of penetrating into the retraction receptacles 62 in the radial direction in relation to the pivot axis 22 in order to create the possibility for the respective rotation blocking bodies 54 of allowing the first receptacles 60, together with the pivot bearing body 14, to move in rotation about the pivot axis 22 in relation to the guide body 40, with the result that the pivot bearing body 14 is rotatable freely and unhindered, with the ball neck 10, in relation to the guide sleeve 44, as illustrated in FIG. 9, in which case the rotation blocking bodies 54 do not extend beyond the external outside face 46 of the guide sleeve 44.

Figure 7:
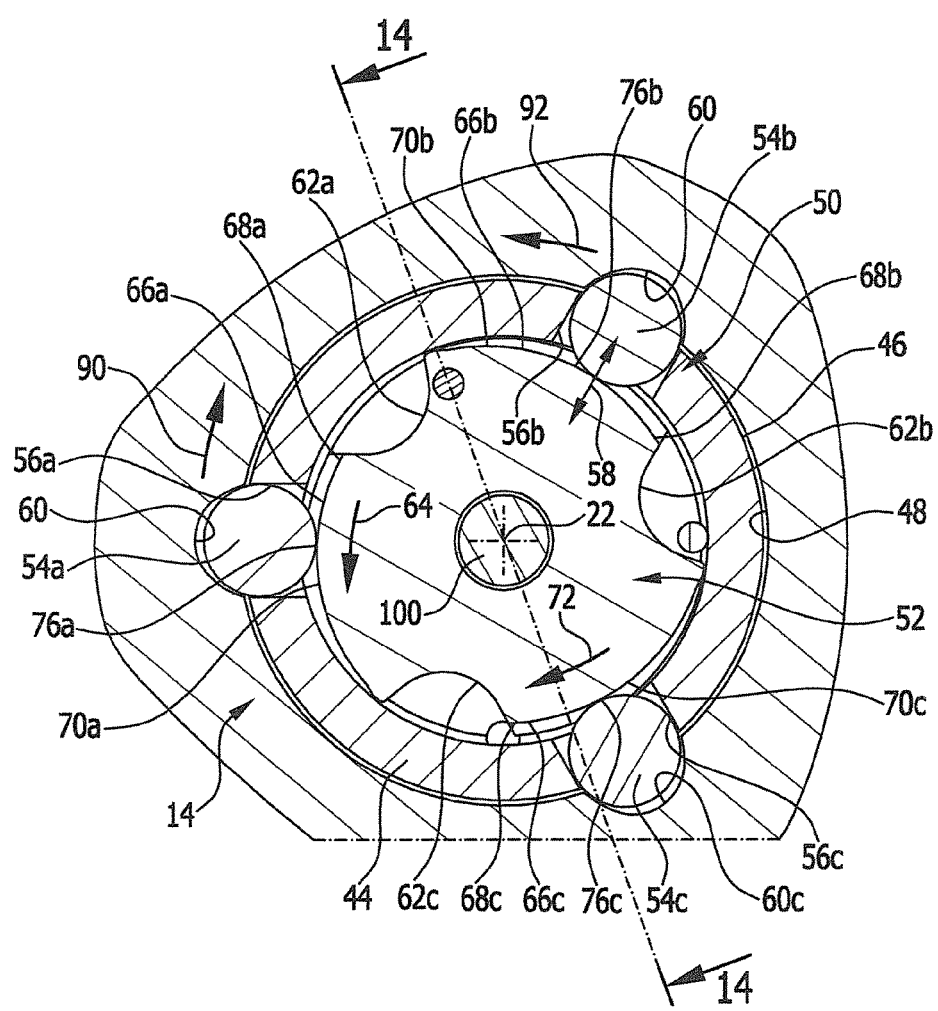
FIG. 7 shows a section along the line 7-7 in FIG. 6.

Rotation of the actuating body 52, when the rotation blocking bodies 54 are seated in the retraction receptacles 62, in a direction of rotation 72 opposed to the direction 64 of revolution has the effect that the rotation blocking bodies 54 are moved out of the retraction receptacles 62 and are initially seated, as illustrated in FIG. 7, against the starting regions 68 of the pressure faces 66, in the active position of the actuating body 52, but at the same time penetrate for example into the first receptacles 58 and hence prevent free rotatability of the pivot bearing body 14 in relation to the guide body 40.

If the actuating body 52 is turned further in the direction of rotation 72 opposed to the direction 64 of revolution, then regions of the pressure faces 66 that lie further and further radially outwards in respect of the pivot axis 22 act on the rotation blocking bodies 54 and thus, in the operative position A of the ball neck 10, press the rotation blocking bodies 54 increasingly into the first receptacles 60a, 60b and 60c in order in this way to achieve fixing of the pivot bearing body 14 with substantially no play in relation to the guide body 40, in this case in relation to the guide sleeve 44.

In the rotation blocking position of the rotation blocking bodies 54, the actuating body 52 is in its active position such that, as illustrated in FIG. 7, the rotation blocking bodies 54 lie approximately at central regions 76, between the starting regions 68 and the end regions 70, of the pressure faces 66 and are urged thereby.

Locking the pivot bearing body 14 without play, by the rotation blocking bodies 54, can be achieved particularly favourably if the rotation blocking bodies 54 and the receptacles 60 are formed such that, as one of the rotation blocking bodies 54 penetrates increasingly into one of the receptacles 60 and the rotation blocking bodies 54 abut against a side of the receptacles 60, bring about twisting of the pivot bearing body 14, and the set of rotation blocking bodies 54a to 54c acts on the receptacles 60 with torque forces 90, 92 that act in opposing directions, in order to fix the pivot bearing body 14 without play (FIG. 7).

In order to create the possibility for the actuating body 52 of urging in each case, and in optimum manner, each of the three rotation blocking bodies 54, it is provided for centring of the actuating body 52 to take place in the active position in accordance with the position of the rotation blocking bodies 54. In particular, the actuating body 52 is mounted on a guide shaft 100, wherein the actuating body 52 can centre itself within the guide body 40 as a result of the play, provided by an intermediate space, in relation to the guide shaft 100 in a manner corresponding to the position of the rotation blocking bodies 54 that is the result of manufacturing tolerances, wherein the self-centring of the actuating body 52 can differ slightly from a coaxial arrangement in relation to the guide shaft 100 and thus in relation to the geometric pivot axis 22.

Because of the self-centring, the rotation blocking bodies 54a, 54b and 54c act on the receptacles 60a, 60b and 60c in the respective guide direction 58a, 58b and 58c with forces of approximately equal size, with the result that the reaction forces acting on the actuating body 52 are also of approximately the same size.

In the illustrated exemplary embodiment of the solution according to the invention, the rotation blocking bodies 54 are arranged in the guide receptacles 56 at the same angular spacing around the pivot axis 22, with the result that the reaction forces of approximately the same size that result from the self-centring, and which act on one of the rotation blocking bodies 54a, 54b, 54c, act on the other rotation blocking bodies 54b and 54c, 54a and 54c and 54a and 54b in equal parts and thus cancel one another out overall, with the result that the forces on the actuating body 52 are at equilibrium and there is no need for additional support.

Preferably, the rotation blocking bodies 54 are constructed as balls, which thus abut on the one hand against the actuating body 52 and on the other also against the receptacles 60.

The guide shaft 100 thus provides only a rotational mounting that is associated with play to the actuating body 52, in relation to the pivot axis 22, and this is primarily significant when the actuating body 52 keeps the rotation blocking bodies 54 in a release position in which the rotation blocking bodies 54 penetrate into the retraction receptacles 62 of the actuating body 52.

In order to cause the actuating body 52 always to move in the direction of rotation 72 without any external influence, with the rotation blocking bodies 54 moving in the direction of the rotation blocking position, the actuating body 52 is urged by a torsional spring 102 which on the one hand acts on the actuating body 52 and on the other is supported against the guide body 40.

The torsional spring 102 also has the effect that the actuating body 52 presses the rotation blocking bodies 54 under force into the receptacles 60 and thus the pivot bearing body 14 is fixed without play, wherein the absence of play is still maintained if the geometry of the receptacles 60 changes during operation because of the loads as a result of the actuating body 52 turning further in the direction of rotation 72.

The guide sleeve 44 extends, by means of a portion forming a receptacle 102 for the actuating body 52, between the flange 42 and a cover 104 that closes off the guide sleeve 44 and is preferably integrally formed in one piece with the guide sleeve 44 and delimits the receptacle 102 for the actuating body 52, such that the actuating body 52 is guided radially in relation to the pivot axis 22 by the receptacle 102 of the guide sleeve 44, and is guided axially in relation to the direction of the pivot axis 22 by abutment against an inner side 108 of the cover 104.

Further, the cover 104 has a bore 106 for receiving the guide shaft 100, which passes through the cover 104.

On an opposite side of the receptacle 102 for the actuating body 52 to the cover 104, the guide sleeve 44 forms, for example by means of a portion passing through the flange 42, a torsional spring receptacle 112 in which a torsional spring 114 is arranged adjoining the actuating body 52 and is fixed on the one hand, by an outer end, in the torsional spring receptacle 112 and, by an inner end, to a drive sleeve 122 which is coupled to the actuating body 52 in a manner fixed in rotation therewith.

Figure 10:
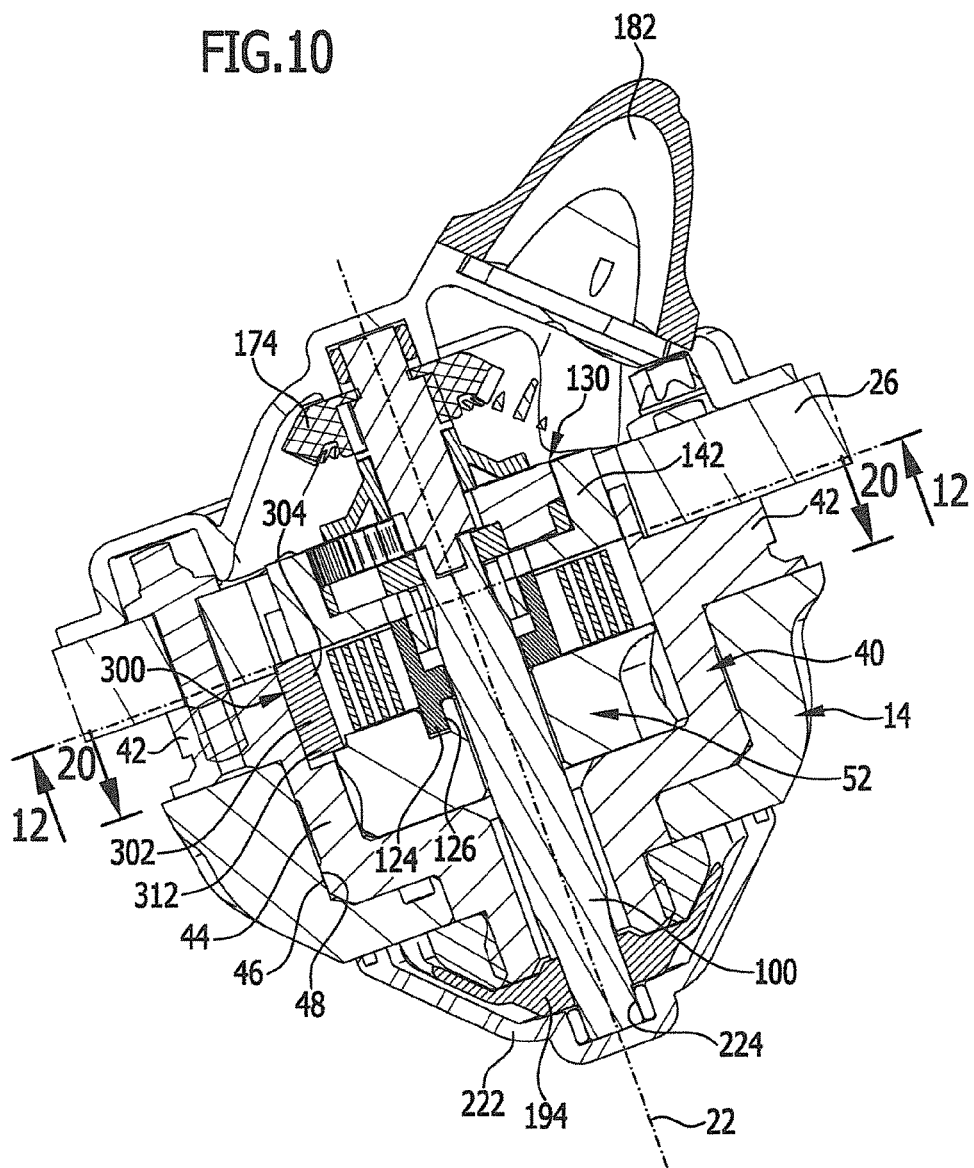
FIG. 10 shows a section along the line 10-10 in FIG. 20.
Figure 11:
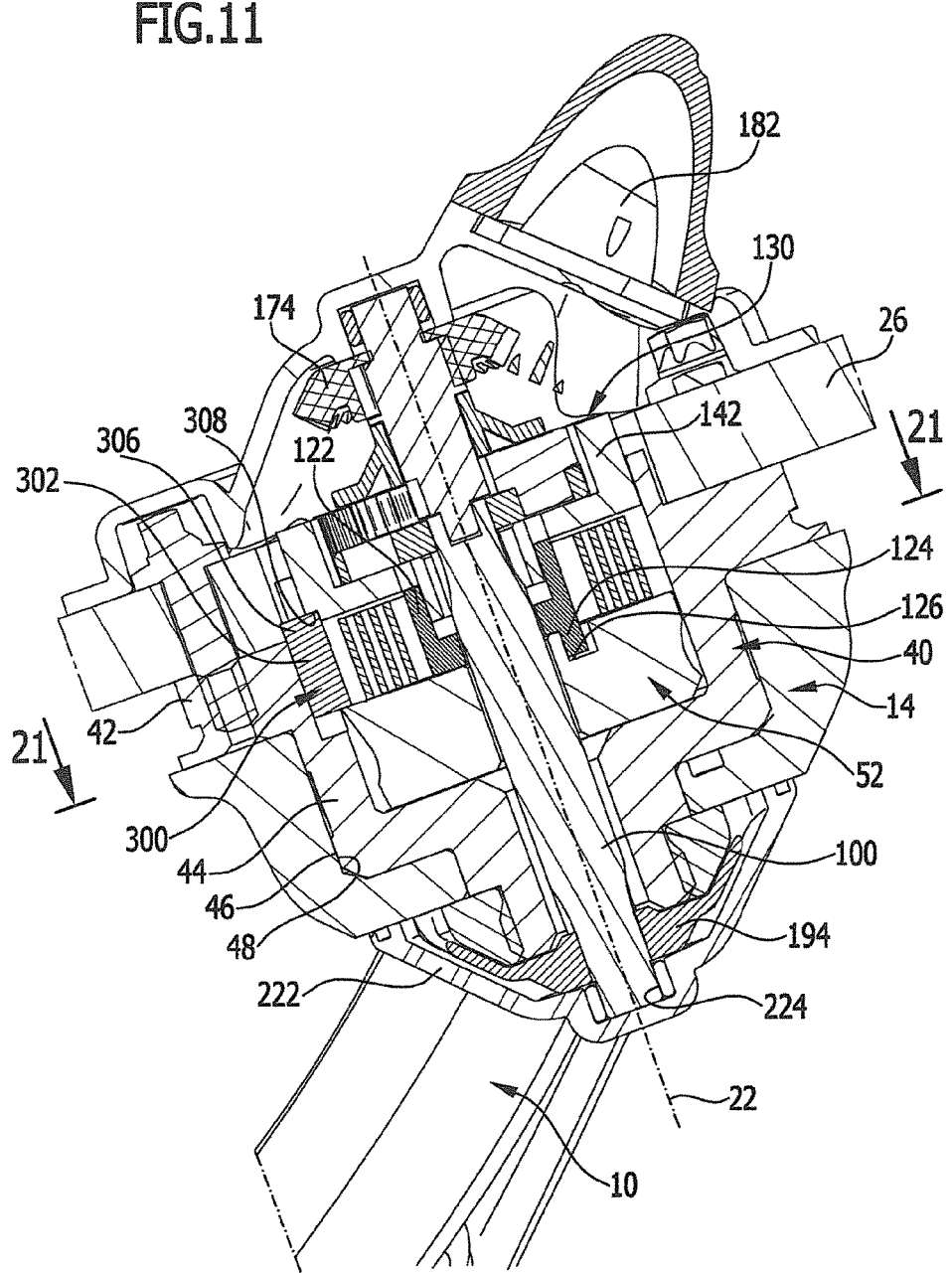
FIG. 11 shows a section along the line 11-11 in FIG. 21.

For this purpose, as illustrated in FIGS. 10 and 11, the drive sleeve 122 is provided for example with extensions 124 which engage in corresponding receptacles 126 in the actuating body 52.

Because the torsional spring 114 acts on the drive sleeve 122, which is coupled to the actuating body 52 in a manner fixed in rotation therewith, the action of the torsional spring 114 on the drive sleeve 122 has the effect of driving the actuating body in the direction of rotation 72, such that while the torsional spring 114 acts unhindered on the drive sleeve 122 the actuating body 52 always urges the actuating body 52 such that the latter tends to press the rotation blocking bodies 54 under force into the receptacles 60 and thus to fix the pivot bearing body 14 in a manner fixed in rotation with the guide sleeve 44, in particular without play.

In order to be able to move the rotation blocking bodies 54 into the release position, an action on the actuating body 52 in opposition to the direction of rotation 72 and thus also in opposition to the action of the torsional spring 114 is required.

For this purpose, the drive sleeve 122 is drivable by a planetary gearing mechanism 130 which is designated 130 as a whole and which is arranged in a gearing receptacle 132 in the guide sleeve 44, in particular coaxially in relation to the pivot axis 22, which is arranged for example within an aperture 134 in the carrier plate 26 and preferably projects from the flange 42 in the direction of the aperture 134 in the carrier plate.

The planetary gearing mechanism 130 for its part includes a ring gear 142 which is guided in the gearing receptacle 132 and is provided with an internal toothing 144 with which planet gears 146 are in engagement by means of their external toothing 148.

In this case, the planet gears 146 are held rotatably on a planet gear carrier 152 which for its part is connected in a manner fixed in rotation with the guide shaft 100 such that the planet gear carrier 152 forms a power take-off of the planetary gearing mechanism 130 for pivoting the ball neck.

Further, the ring gear 142 includes a flange body 154 that lies between the planet gear carrier 152 and the torsional spring 114 and likewise extends in the direction of the guide shaft 100 and surrounds it, but is rotatable in relation thereto, and forms a power take-off of the planetary gearing mechanism 130 for actuating the rotation blocking arrangement 50.

Figure 12:
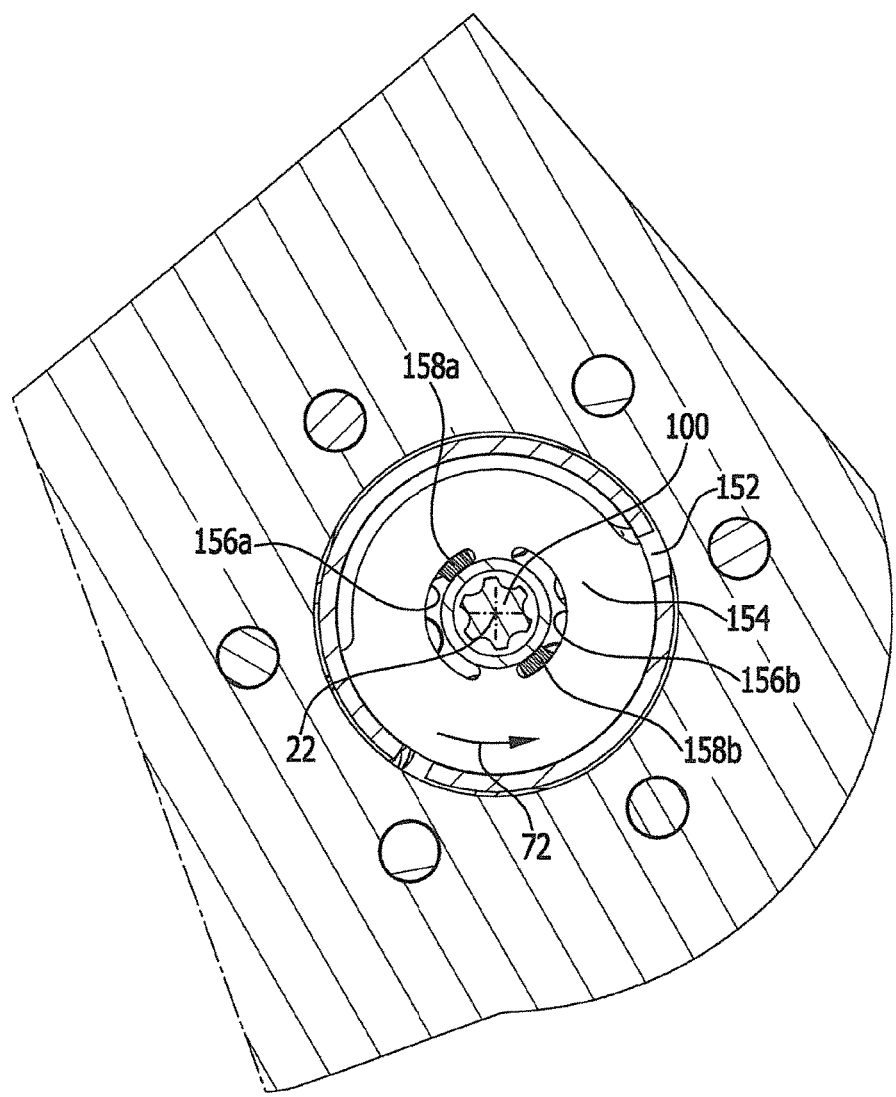
FIG. 12 shows a section along the line 12-12 in FIG. 10.

As illustrated in FIG. 12, the flange body 154 has arcuate drive slots 156a, 156b which are arranged peripherally around the pivot axis 22 and cooperate with drive fingers 158a, 158b of the drive sleeve 122, which engage therein, but wherein the drive slots 156a, 156b are formed such that a free passage of the drive sleeve 122 in relation to the ring gear 142 is possible as a result of the difference between the angular range around the pivot axis 22 over which the drive slots 156 extend and the angular range around the pivot axis 22 over which the drive fingers 158 extend, wherein this free passage will be explained in detail below.

Further, by means of their external toothing 148, the planet gears 146 engage with an external toothing 164 on a sun gear 162 of the planetary gearing mechanism 130, which is seated on a drive shaft that is designated 166 as a whole and is arranged coaxially in relation to the pivot axis 22 and is mounted to be freely rotatable, but coaxial, in relation to the guide shaft 100, for example by means of a terminal shaft journal 168 that engages in a bore 172 in the end face of the guide shaft 100.

At a spacing from the planetary gearing mechanism 130, the drive shaft 166 carries a drive gearwheel 174, such as a bevel gearwheel, which engages with a power take-off gearwheel 176 of a motorised drive unit 182 that includes for example on the one hand a drive motor, preferably an electric motor, and on the other a step-down gearing mechanism for driving the drive gearwheel 176.

The drive unit 182 is for example held on a cover body 184 which, starting from the carrier plate 126, extends over the drive shaft 166 having the drive gearwheel 174 and the power take-off gearwheel 176 meshing therewith, and moreover provides a mounting for the drive shaft 166 on a side remote from the shaft journal 168.

Thus, the planetary gearing mechanism 130 and the drive unit 182 form for example among other things an actuating arrangement 180 for the rotation blocking arrangement 50.

The guide shaft 100, which is coupled in a manner fixed in rotation with the planet gear carrier 152, passes through the cover 104 of the guide body 40—as described above—and is coupled to a drive body 194 in a manner fixed in rotation therewith at an end 192 projecting beyond the cover 104, wherein the drive body 194 has two drive arms 196a and 196b that extend in the direction of an end flange 198 of the pivot bearing body 14, which extends over an external partial region of the cover 104 of the guide body 14.

Here, the end flange 198 extends over the cover 104 of the guide body 40 in an outer region and extends as far as a guide attachment 202 of the cover 104, wherein the end flange 198 embraces an outer cylinder face 206 of the guide attachment 202, for example by means of a radially inner cylinder face 204, and abuts for example against it and hence is likewise additionally guided against the guide attachment 202.

Moreover, a threaded sleeve 212 which is integrally formed in one piece with the guide attachment 202 extends in a prolongation of the guide attachment 202 and a holding ring 214 is set on and fixed to, in particular being screwed onto, the threaded sleeve 212 and reaches over part of the end flange 198 in a radially inner region such that the end flange 198 of the pivot bearing body 14 is guided axially non-displaceably between the cover 104 and the holding ring 214 that is set on the threaded sleeve 212 and thus axially non-displaceably in relation to the guide body 40.

Further, a cover 222 is mounted on the end flange 198 in a manner fixed in rotation therewith and extends over the drive body 194 having the drive arms 196 and forms a bearing receptacle 224 for the end 192 of the guide shaft 100 such that the cover 222 forms with the pivot bearing body 14 a unit that is rotatable about the pivot axis 22.

In this arrangement, the cover 222 is seated with abutment bodies 226a, 226b and 228a, 228b on the end flange 198, wherein the abutment bodies 226a, 226b and 228a, 228b are arranged such that the drive arms 196a and 196b engage by means of their ends 232a, 232b between the abutment bodies 226a, 228a and 226b, 228b but at the same time are rotatable to a limited extent between the abutment bodies 226a, 228a and 226b, 228b with a defined free passage.

Figure 8:
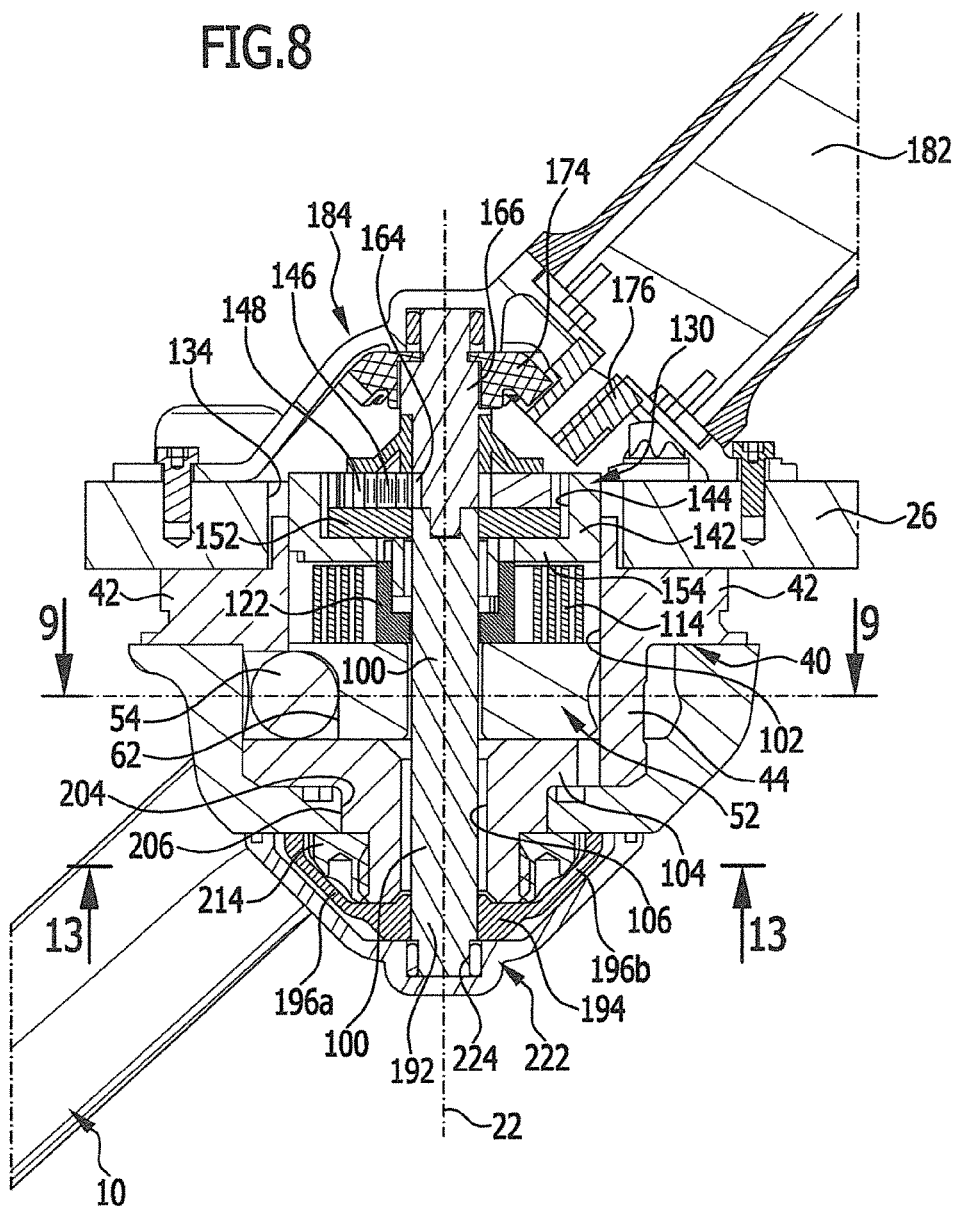
FIG. 8 shows an illustration of a section along the line 8-8 in FIG. 5.
Figure 14:
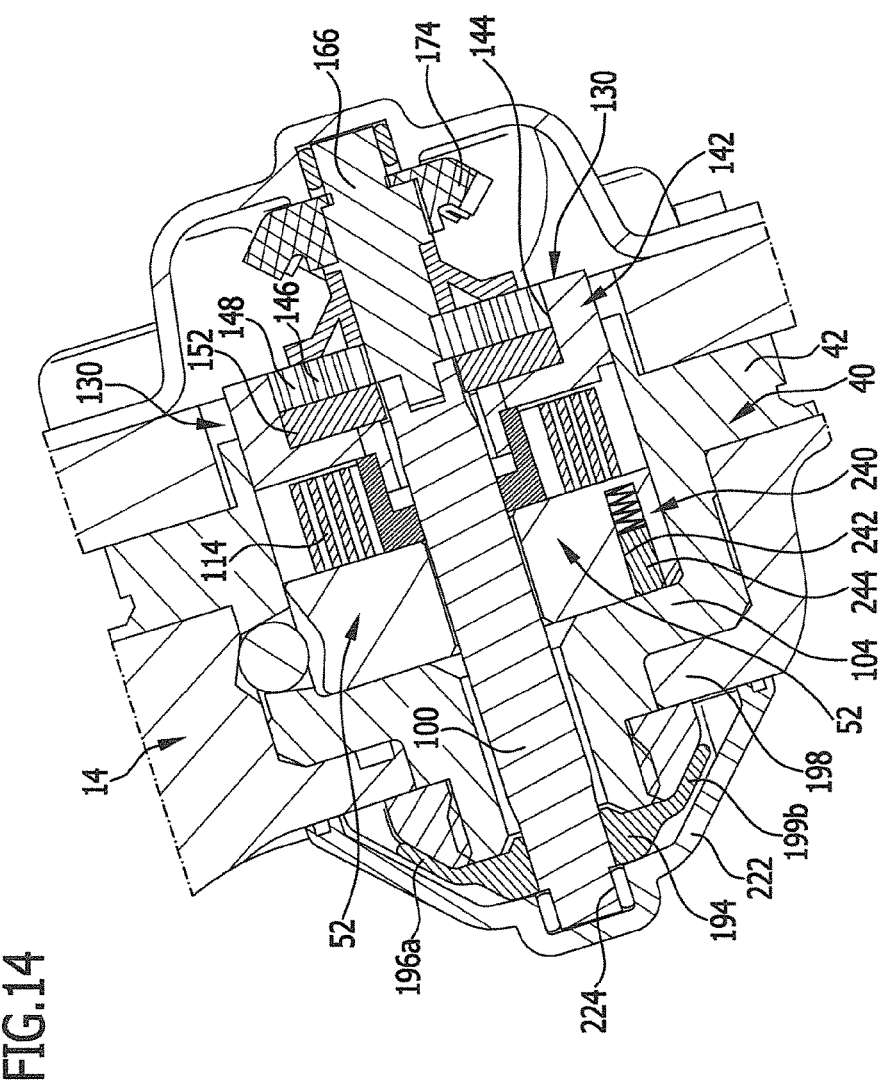
FIG. 14 shows a section along the line 14-14 in FIG. 7.
Figure 16:
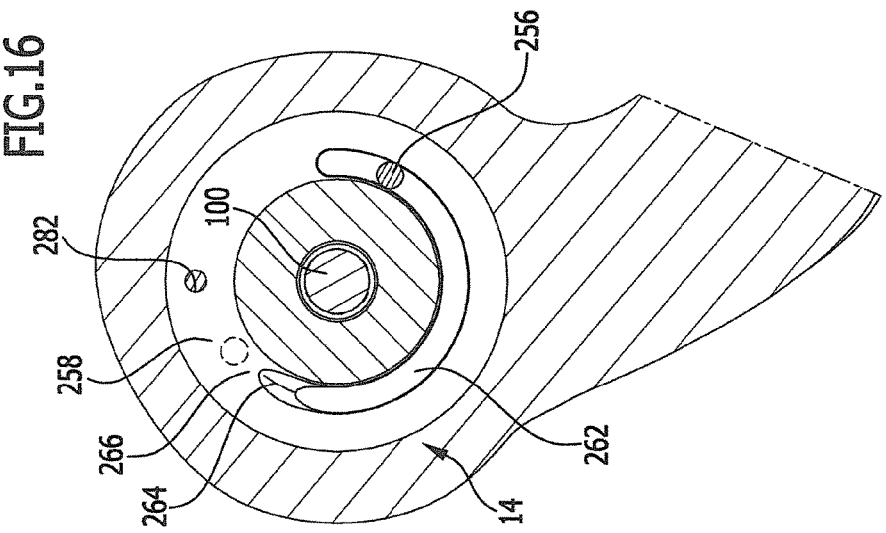
FIG. 16 shows a section along the line 16-16 in FIG. 15.
Figure 15:
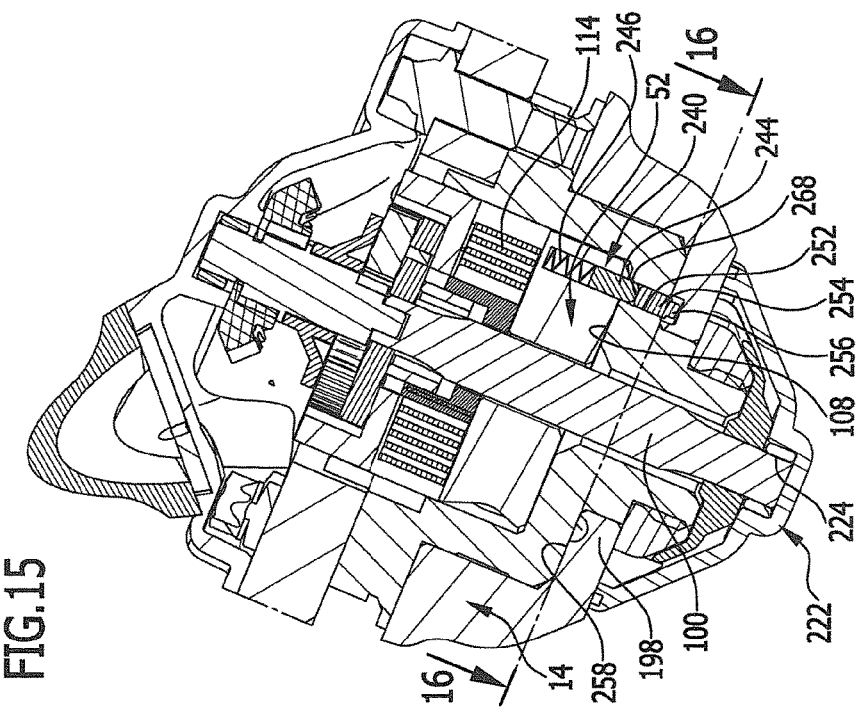
FIG. 15 shows a section along the line 15-15 in FIG. 9.

For fixing the actuating body 52 in the release position, there is provided a release position latching arrangement 240 that is illustrated in FIGS. 14 to 16 and includes for example a latching body 244 that is arranged in a bore 242 in the actuating body 52 and is movable in a latching direction that is parallel to the bore 242, wherein the latching body 244, urged by a spring unit 246, is urged in the direction of a latching position and can thus change over from a latch release position to the latching position and can engage in a latching receptacle 252 in the cover 104 that is constructed as a latching bore when the actuating body 52 is in the release position, illustrated for example in FIGS. 8 and 9.

This means that the spring 246 urges the latching body 244 in the direction of the cover 104, wherein the latching body 244 does not develop a latching effect while it is sliding along the inside 108 of the cover 104, outside the latching receptacle 252, as the actuating body 52 moves.

Figure 6:
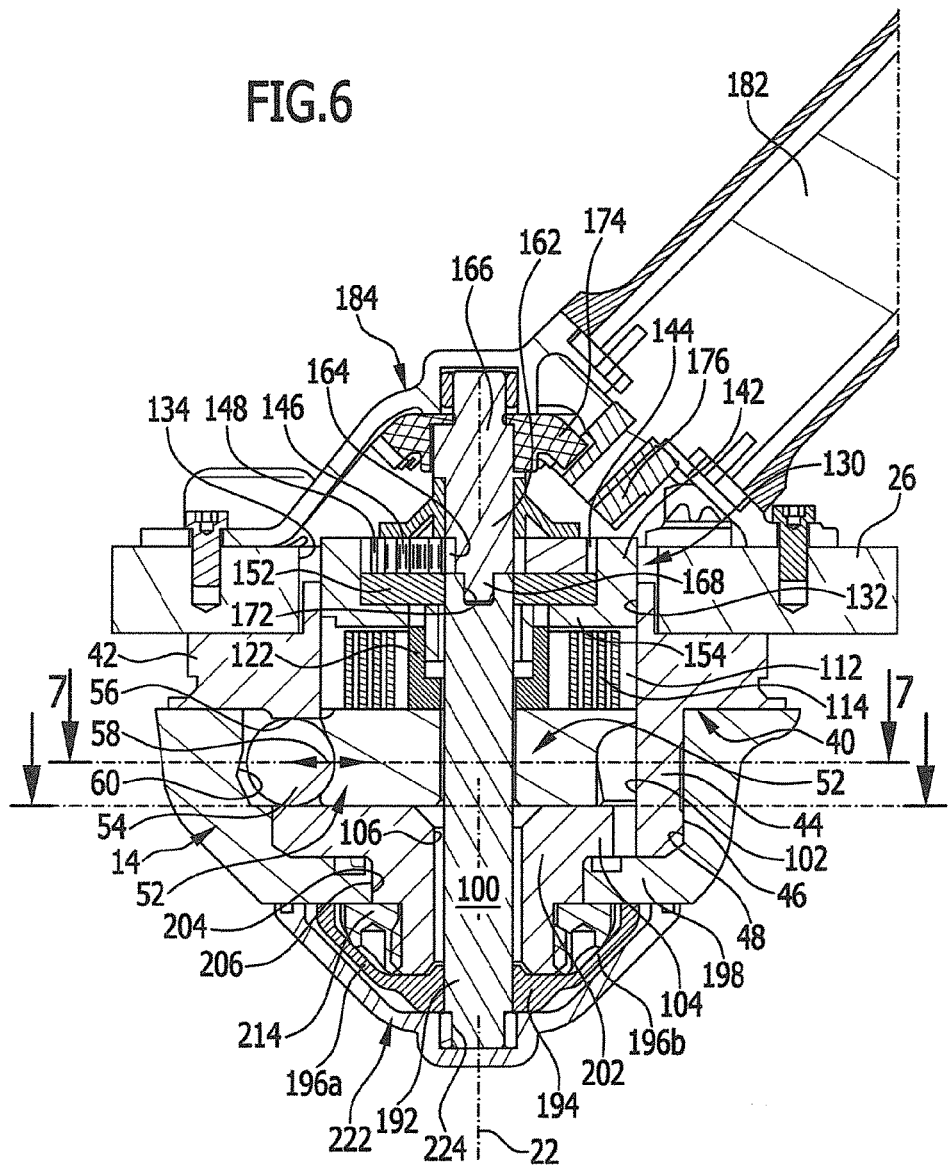
FIG. 6 shows an illustration of a section along the line 6-6 in FIG. 3.

Only once the relative rotation of the actuating body 52 in relation to the cover 104 has gone far enough for it to be in the release position does the latching body 244 engage in the latching receptacle 252 and thus fix the actuating body 52 in the release position such that the latter, despite the action of the torsional spring 114, cannot move back into the rotation blocking position illustrated in FIGS. 6 and 7.

So that the latching body 244 can move out of its latching position engaging in the latching bore 252 again and into the latch release position, there is arranged in the latching receptacle 252 a sensor body 254 which uses a sensor head 256 to scan a flange side 258, facing the cover 104, of the end flange 198, wherein the flange side 258 has a recess 262 in which the sensor head 256 of the sensor body 254 engages if the latter is to permit latching of the latching body 244 in the latching bore 252.

This position is illustrated for example in FIG. 16 by solid lines.

However, in order to release latching and be able to move the latching body 244 from the latching position into the latch release position, in particular directly before the operative position is reached or once the operative position has been reached, the recess 262 merges by means of a ramp 264 into a latch release surface 266 that is higher than the recess 262, wherein the ramp 264 urges the sensor head 256 of the sensor body 254, starting from the recess 262 and increasing in the direction of the latching body 244, and thus the sensor body 254 increasingly displaces the latching body 244 out of the latching receptacle 252 in the direction of the actuating body 252, and when the sensor head 256 has reached the latch release surface 266, as illustrated in a dashed line in FIG. 16, the sensor body 254 is displaced in the direction of the actuating body far enough for the end face 268 thereof opposite the sensor body 256 to be flush with the inner side 108 of the cover 104.

In this way, latching of the actuating body 52 in the release position by means of the latching body 244 is released when the operative position A is reached, with the result that the actuating body 52 then twists into the rotation blocking position as a result of the force exerted by the torsional spring 114 and in this way fixes the pivot bearing body 214 in this position in a manner fixed in rotation with the guide body 40.

The position of the bore 242 that guides the latching body 244, and that of the latching receptacle 252, and the position of the latch release surface 266 are selected such that directly before the operative position A is reached the sensor head 256 of the sensor body 254 reaches the latch release surface 266 and so the sensor body 254 moves the latching body 244 out of the latching receptacle 252 and hence releases latching of the actuating body 52 in its release position directly before the operative position is reached or at the latest when it is reached, with the result that, even in the operative position A, the rotation blocking bodies 54 can engage in the receptacle 60, which in this position are arranged in alignment with the guide receptacles 56, and fix the pivot bearing body 14 in a manner fixed in rotation with the guide body 40.

In the solution described above, only one set of receptacles 60 for fixing the pivot bearing body 14 so that it is fixed in rotation in the operative position A is provided, while in the rest position R there is no provision for fixing the pivot bearing body 14 by the rotation blocking arrangement 50.

Rather, for fixing the pivot bearing body 14 in the rest position, as illustrated in FIG. 17, a rest position latching arrangement 270 is provided which has a latching body 274 that is provided in a bore 272 in the cover 104, wherein the latching body 274 is urged in the direction of a latching direction parallel to the bore 272 and towards the end flange 198 by a spring element 276 arranged for example in the bore 272, and engages in a latching receptacle 282 in the form of a latching bore in the end flange 198 when the pivot bearing body 14 is in the rest position. For this purpose, the spring element 276 constantly urges the latching body 274 in the direction of the flange side 258 of the end flange 198 that faces the cover 104, wherein it is only possible for the latching body 274 to engage in the latching receptacle 282 once the pivot bearing body 14 has reached the rotational position that corresponds to the rest position R in relation to the guide body 40.

In order to release the latching, there is provided in the latching receptacle 282 a sensor body 284 which by means of a sensor head 286 projects beyond the end flange 198 in the direction of one of the ends 232 of one of the drive arms 196, as illustrated in FIG. 18.

Figure 19:
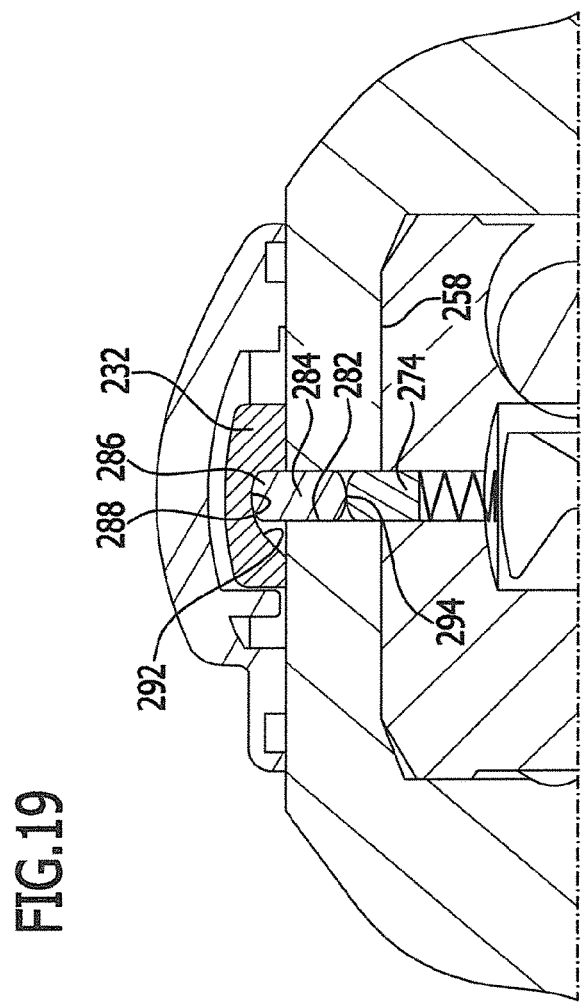
FIG. 19 shows a section along the line 19-19 in FIG. 17.

In this case, as illustrated in FIG. 18 and FIG. 19, the sensor body 286 can only engage in a recess 288 in one of the ends 232 when, as illustrated in FIG. 18, the end 232a abuts against the abutment body 226a, which is the case once the pivot bearing body 14 and thus the ball neck 10 have been moved into the rest position as a result of the end 232a acting on the abutment body 226a.

The recess 288 is further provided with a ramp 292 which becomes effective once the end 232a of the drive arm 196a moves away from the abutment body 226a in the direction of the abutment body 228a.

In this case, the ramp 292 acts on the sensor head 286 such that the sensor body 284 is pushed into the latching receptacle 282 until it has pushed the latching body 274 out of its rest position latching position in the latching bore 282 and has moved it into a free-movement position, wherein an end face 294 of the sensor body 284 at the end opposite the sensor head 286 ends flush with the flange side 258, with the result that it is no longer possible for the latching body 274 to fix the pivot bearing body 14 having the end flange 98 in relation to the cover 104, but instead the latching body 274 is in its free-movement position and permits free rotatability of the end flange 198 with the pivot bearing body 14 in relation to the guide body 14, in particular in relation to the cover 104 thereof.

In order to secure the actuating body 52 to prevent undesired twisting into the release position, there is provided, as illustrated in FIGS. 10 and 11 and in 20 and 21, in the guide body 40, in particular in the region of the torsional spring receptacle 112, a securing arrangement 300 that has a securing body 302, which according to FIGS. 20 and 21 is guided in the guide body 40, in particular in the region of the torsional spring receptacle 112, over more than half a peripheral side and projects into the torsional spring receptacle 112 by means of a securing body segment 304 but at the same time does not interact with the torsional spring 114.

Rather, the securing body 302 extends between the ring gear 142 of the planetary gearing mechanism 130 and the actuating body 52 such that the securing body 302 engages by means of the securing body segment 304, which projects radially into the torsional spring receptacle 112, either in an unsecured position with one end 306 in a recess 308 in the ring gear 142, as illustrated in FIG. 11, or in a secured position with one end 312 in a recess 314 in the actuating body 52, as illustrated in FIG. 10 and FIG. 20.

As soon as the securing body 302 engages, in its secured position, by means of the end 312 in the recess 314 in the actuating body 52, as illustrated in FIG. 20, it is no longer twistable far enough for the release position to be reachable.

Rather, in this secured position of the securing body 302, which is illustrated for example in FIG. 20, the rotation blocking body remains in its rotation blocking position.

In order to reach the release position of the rotation blocking body 52, which is illustrated in FIG. 11 and FIG. 21, it is necessary to displace the securing body 302 such that, as illustrated in FIG. 21, it disengages from the recess 314 in the actuating body 52. This is possible if the securing body 302 is in a position to engage in the recess 308 in the ring gear 142, as illustrated in FIGS. 11 and 21.

In this case, the recess 308 is arranged such that it is only possible for the securing body 302 to engage in the recess 308 by means of the end 306 if the ring gear 142 has been twisted, utilising the free passage through the drive slots 156 and the drive fingers without causing the actuating body 52 to twist, with the result that subsequently the actuating body 52 can be moved out of the rotation blocking position out of the rotation blocking position as a result of the ring gear 142 continuing to turn with a rotary action on the drive sleeve 122.

Functioning of the trailer coupling according to the invention is as follows.

Starting from the operative position, illustrated in FIGS. 1, 2, 3 and 6 and 7, in which the pivot bearing body 14 is blocked from rotation relative to the guide body 40 in respect of a rotary movement about the pivot axis 22 because the actuating body 52 has moved the rotation blocking bodies 54 in the guide direction 58 radially far enough outwards from the pivot axis 22 for them to engage in the receptacles 60 and hence fix the pivot bearing body 14 such that rotation in relation to the guide body 40 is blocked, switching on the drive unit 182 has the effect that the drive gearwheel 174 is driven by the power take-off gearwheel 176 such that the drive shaft 166 drives the sun gear 162.

This in turn triggers the planet gears 146, but because the pivot bearing body 14 is blocked from a rotary movement about the pivot axis 22 by the rotation blocking arrangement 50 the planet gears 146 are likewise blocked, with the result that the drive arms 196 of the drive body 194 cannot twist in relation to the abutment bodies 226 and 228, and consequently no rotary movement of the guide shaft 100, to which the planet gear carrier 152 is connected such that it cannot rotate therewith, can take place either.

As a result, the ring gear 142 is driven in such a way that the latter twists far enough for the securing body 302 to be able to engage in the recess 308 in the ring gear 142 and to change over from the secured position to the unsecured position, and then the drive sleeve 122 is twisted by way of the drive slots 156 and the drive fingers 158, wherein the drive sleeve 122 is connected to the actuating body 52 in a manner that prevents rotation therewith by the extensions 124.

As a result, the actuating body 52 is twisted by the ring gear 142 from the rotation blocking position in the direction of its release position, far enough for the release position to be reached and the release position latching arrangement 240 of the actuating body 52 to become effective and to latch the latter in the release position relative to the guide body 40 in the manner described, and as illustrated in FIG. 15.

Figure 13:
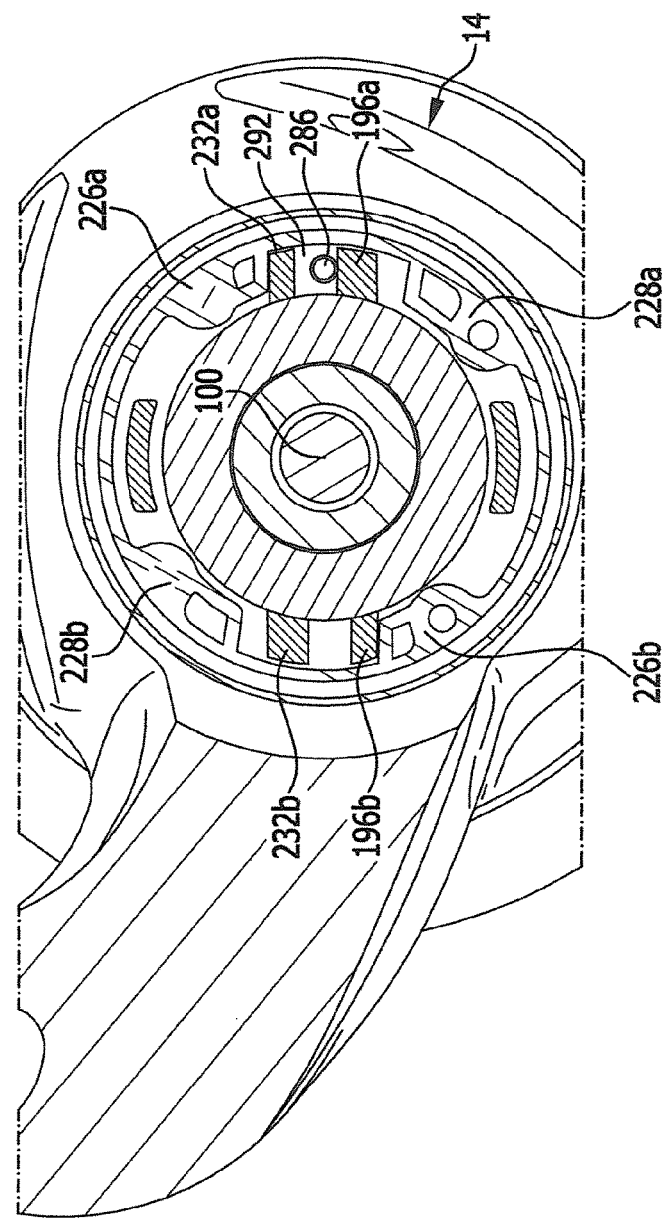
FIG. 13 shows a section along the line 13-13 in FIG. 8.

Because, once the release position has been reached, a rotary movement of the pivot bearing body 14 is now possible and moreover the rotary movement of the actuating body 52 in a direction opposed to the direction of rotation 72 is now blocked by the release position latching arrangement 240, the ring gear 142 remains stationary, while the planet gear carrier 146 now rotates, wherein the latter, by way of the guide shaft 102 and the drive body 194 having the drive arms 196, is in a position to pivot the pivot bearing body 14 about the pivot axis 22 in the direction of the rest position R, during which the drive arms 196 abut by means of the ends 232 against the abutment bodies 226, as illustrated in FIG. 13.

Once the rest position R has been reached, the rest position latching device 270 becomes effective in that the latching body 274 is in a position to engage in the latching bore 282 and to displace the sensor body in the direction of the recess 288 and allow it to enter the ends 232 of the drive arms 196.

This brings about latching of the pivot bearing body 14 in the rotary position that corresponds to the rest position R of the ball neck 10, as a result of the rest position latching device 270.

In this rest position the drive unit 182 is now switched off.

If the ball neck 10 is to be pivoted back from the rest position R into the operative position A, the drive unit 182 is operated in the reverse direction of rotation.

Since it is not possible to twist the actuating body 52 because of the active release position latching arrangement, a rotary movement of the planet gear carrier 152 is performed, wherein the latter drives the drive body 194 having the drive arms 196 by way of the guide shaft 100 and twists the ends 232 in the direction of the abutment bodies 228, as shown for example by FIG. 13.

This has the result that the ramp 292 becomes effective and acts on the sensor head 286 of the sensor body 284, and results in the manner described in release of the rest position latching device 270, that is to say in a change-over from the rest position latching position to the free-movement position, such that further action of the ends 232 of the drive arms 196 on the abutment bodies 228 brings about pivoting of the pivot bearing body 14 with twisting of the ball neck 10 in the direction of the operative position A.

Directly before the operative position A is reached, release of the release position latching arrangement 240 is performed in the manner described, as illustrated for example in FIGS. 14 to 16, that is to say a change-over thereof is performed from the latching position to the latch release position and thus movement of the actuating body 52 is allowed for movement in the direction of rotation 72 under the action of the torsional spring 114 in the direction of the rotation blocking position, wherein the rotation blocking bodies 54 are pressed by the actuating body 52 radially outwards in relation to the pivot axis 22 into the receptacles 60 and thus once again result in blocking of rotation of the pivot bearing body 14 relative to the guide body 40.

In this locked position of the pivot bearing body 14 relative to the guide body 40, once again a rotary movement of the planet gear carrier 152 is blocked, with the result that the ring gear 142 is turned further, into a position illustrated in FIG. 12, in which the actuating body 52 can carry out a further rotary movement in the direction of rotation 72 under the action of the torsional spring 114, with the result that in the operative position the ring gear 42 does not hinder adjustment by turning the actuating body 52 further in the direction of rotation 72 under the action of the torsional spring 114.

The invention claimed is:

1. A trailer coupling including a ball neck, which is movable between an operative position and a rest position and which has a pivot bearing body arranged at a first end and a coupling ball arranged at a second end, a pivot bearing unit, which is arranged fixed to the vehicle and by means of which the pivot bearing body is received such that it is pivotal about a pivot axis between the operative position and the rest position, and a rotation blocking arrangement having at least two rotation blocking bodies, which are guided by means of a guide body to be movable in a guide direction having at least one component in the radial direction relative to the pivot axis, wherein, in the operative position, the rotation blocking bodies are movable into a rotation blocking position by a movement in the guide direction and, in this rotation blocking position, engage with a receptacle in the pivot bearing body in order to block a pivotal movement of the pivot bearing body about the pivot axis relative to the guide body, and are movable into a release position and, in this release position, are not in engagement with the respective receptacle, and having an actuating body which has a respective cam face, that runs transversely to the guide direction, for each of the rotation blocking bodies and which is arranged to be rotatable about the pivot axis and as a result of the rotary movement whereof in a direction of actuation the at least two rotation blocking bodies are movable and urgeable in the guide direction, a latching arrangement for the release position is provided which, in a release position of the actuating body, is movable between a latch release position that allows movement of the actuating body in relation to the guide body and a latching position that fixes the actuating body in relation to the guide body, and which is urged in the direction of the latching position by an energy store, at least in the release position of the actuating body, wherein the latching arrangement for the release position in the release position of the actuating body changes over to the latching positron automatically once the pivot bearing body has left a rotary position that corresponds to the operative position.

2. A trailer coupling according to claim 1, wherein, once at least one functional position of the trailer coupling has been reached, the latching arrangement for the release position changes over from the latching position to the latch release position.

3. A trailer coupling according to claim 2, wherein the latching arrangement for the release position changes over from the latching position to the latch release position in dependence on at least one particular rotary position of the pivot bearing body.

4. A trailer coupling according to claim 3, wherein, once the at least one particular rotary position of the pivot bearing body has been reached, the release position latching arrangement changes over from the latching position to the latch release position by mechanical control.

5. A trailer coupling according to claim 2, wherein, once at least one predetermined rotary position of the pivot bearing body has been reached, the latching arrangement for the release position changes over from the latching position to the latch release position.

6. A trailer coupling according to claim 1, wherein the rotation blocking bodies are arranged around the actuating body.

7. A trailer coupling according to claim 6, wherein the actuating body has cam faces that extend over an angular region about the pivot axis and vary in respect of their radial spacing from the pivot axis.

8. A trailer coupling according to claim 6, wherein a guide body that adjoins the pivot bearing body in the radial direction guides the rotation blocking body.

9. A trailer coupling according to claim 8, wherein the guide body has a guide sleeve with a guide receptacle for the respective rotation blocking body.

10. A trailer coupling according to claim 8, wherein the guide body forms a pivot bearing for the pivot bearing body.

11. A trailer coupling according to claim 8, wherein the guide body is part of the pivot bearing unit, which is arranged fixed to the vehicle.

12. A trailer coupling according to claim 6, wherein a bearing for the actuating body is connected to the guide body.

13. A trailer coupling according to claim 6, wherein the actuating body is surrounded by the guide body, and in that the pivot bearing body embraces the guide body.

14. A trailer coupling according to claim 1, wherein the pivot bearing body forms an external body which surrounds the pivot bearing unit on the outside and which is arranged to be non-displaceable in the direction of the pivot axis in relation to the pivot bearing unit.

15. A trailer coupling according to claim 14, wherein the first end of the ball neck is attached to the external body.

16. A trailer coupling according to claim 1, wherein the pivot bearing body forms an external body which surrounds the rotation blocking unit on the outside, and which is arranged to be non-displaceable in the direction of the pivot axis in relation to the guide body.

17. A trailer coupling according to claim 1, wherein the actuating body is urged in the direction of its rotation blocking position by an elastic energy store.

18. A trailer coupling according to claim 17, wherein the actuating body is movable from the rotation blocking position into the release position by an actuating arrangement.

19. A trailer coupling according to claim 18, wherein the actuating body is movable by the actuating arrangement in opposition to the urging of the energy store.

20. A trailer coupling according to claim 18, wherein the actuating arrangement has a drive element that is coupled to the actuating body.

21. A trailer coupling according to claim 20, wherein the drive element and the actuating body are coupled to one another by way of an entrained coupling arrangement.

22. A trailer coupling according to claim 21, wherein the entrained coupling arrangement has a free-running condition, which is free of entrainment, and an entraining condition.

23. A trailer coupling according to claim 1, wherein a motorised drive is provided for actuation of the rotation blocking arrangement.

24. A trailer coupling according to claim 23, wherein the drive for the rotation blocking arrangement and a drive for the pivotal movement of the pivot bearing body are coupled by a planetary gearing mechanism.

25. A trailer coupling according to claim 24, wherein the planetary gearing mechanism is drivable by a single motorised drive.

26. A trailer coupling according to claim 24, wherein the planetary gearing mechanism enables a change-over to be made between a power take-off for actuating the rotation blocking arrangement and a power take-off for performing the pivotal movement of the pivot bearing body.

27. A trailer coupling according to claim 24, wherein there is provided a planetary gearing mechanism that is driven by a drive unit, in that a power take-off of the planetary gearing mechanism acts as an actuator on the actuating body in order to move the latter from the rotation blocking position into the release position, and in that another power take-off of the planetary gearing mechanism acts as a pivotal drive on the pivot bearing body for pivoting the ball neck between the operative position and the rest position.

28. A trailer coupling according to claim 24, wherein driving of the pivotal movement or the rotation blocking arrangement is performed in dependence on restraint of driving the rotation blocking arrangement or the pivotal movement.

29. A trailer coupling according to claim 24, wherein the planetary gearing mechanism is arranged coaxially in relation to the pivot axis.

30. A trailer coupling according to claim 24, wherein the planetary gearing mechanism is arranged on a side of the actuating element facing the motorised drive.

31. A trailer coupling according to claim 24, wherein, as seen in the direction of the pivot axis, the planetary gearing mechanism is driven by the motorised drive on one side and has a power take-off for the actuating element on the opposite side.

32. A trailer coupling according to claim 24, wherein the planetary gearing mechanism is arranged, as seen in the direction of the pivot axis, between the motorised drive and the actuating element.

33. A trailer coupling according to claim 24, wherein the planetary gearing mechanism, the energy store and the actuating element are arranged one after the other in the direction of the pivot axis.

34. A trailer coupling according to claim 1, wherein a motorised drive is provided as a pivot drive for performing the pivotal movement of the pivot bearing body.

35. A trailer coupling according to claim 1, wherein the actuating body is blockable by a securing arrangement.

36. A trailer coupling according to claim 35, wherein the actuating body is blockable by a securing arrangement to prevent it from reaching its release position.

37. A trailer coupling including a ball neck, which is movable between an operative position and a rest position and which has a pivot bearing body arranged at a first end and a coupling ball arranged at a second end, a pivot bearing unit, which is arranged fixed to the vehicle and by means of which the pivot bearing body is received such that it is pivotal about a pivot axis between the operate position and the rest position, and a rotation blocking arrangement having at least two rotation blocking bodies, which are guided by means of a guide body to be movable in a guide direction, having at least one component in the radial direction relative to the pivot axis, wherein, in the operative position, the rotation blocking bodies are movable into a rotation blocking position by a movement in the guide direction and, in this rotation blocking position, engage with a receptacle in the pivot bearing body in order to block a pivotal movement of the pivot bearing body about the pivot avis relative to the guide body, and are movable into a release position and in this release position, are not in engagement with the respective receptacle, and having an actuating body which has a respective cam face, that runs transversely to the guide direction, for each of the rotation blocking bodies and which is arranged to be rotatable about the pivot axis and as a result of the rotary movement whereof in a direction of actuation the at least two rotation blocking bodies are movable and urgeable in the guide direction, a latching arrangement for the release position is provided which, in a release position of the actuating body, is movable between a latch release position that allose movement of the actuating body in relation to the guide body and a latching position that fixes the actuating body in relation to the guide body, and which is urged in the direction of the latching position by a spring element, at least in the release position of the actuating body;

wherein the latching arrangement for the release position includes a latching body that is guided in a latching direction in one of the actuating body and guide body, and a latching receptacle that is provided in the other of one of the actuating body and guide body and in which the latching body engages in the latching position and from which it is disengaged in the latch release position.

38. A trailer coupling according to claim 37, wherein the latching body is arranged such that it is guided in the latching direction in the actuating body, and the latching receptacle is arranged in the guide body.

39. A trailer coupling according to claim 37, wherein a sensor body is associated with the latching receptacle, and this sensor body detects the presence of rotary positions of the pivot bearing body in relation to the guide body.

40. A trailer coupling according to claim 39, wherein the sensor body uses a sensor head to scan a scannable contour that is arranged on the pivot bearing body and is movable with the pivot bearing body, to detect the individual rotary positions of the pivot bearing body.

41. A trailer coupling according to claim 39, wherein, in at least one predetermined rotary position of the pivot bearing body, the sensor body displaces the latching body from the latching receptacle.

42. A trailer coupling according to claim 37, wherein the latching body is movable in a latching direction that runs parallel to the pivot axis.

43. A trailer coupling including a ball neck, which is movable between an operative position and a rest position and which has a pivot bearing body arranged at a first end and a coupling ball arranged at a second end, a pivot bearing unit, which is arranged fixed to the vehicle and by means of which the pivot bearing body is received such that it is pivotal about a pivot axis between the operative position and the rest position, and a rotation blocking arrangement having at least two rotation blocking bodies, which are guided by means of a guide body to be movable in a guide direction having at least one component in the radial direction relative to the pivot axis, wherein, in the operative position, the rotation blocking bodies are movable into a rotation blocking position by a movement in the guide direction and, in this rotation blocking position, engage with a receptacle in the pivot bearing body in order to block a pivotal movement of the pivot bearing body about the pivot axis relative to the guide body, and are movable into a release position and, in this release position, are not in engagement with the respective receptacle, and having an actuating body which has a respective cam face, that runs transversely to the guide direction, for each of the rotation blocking bodies and which is arranged to be rotatable about the pivot axis and as a result of the rotary movement whereof in a direction of actuation the at least two rotation blocking bodies are movable and urgeable in the guide direction, a latching arrangement for the rest position is provided that is independent of the rotation blocking arrangement and that, in a free-movement position, permits movement of the pivot bearing body in relation to the guide body and, in a rest position latching position, fixes the pivot bearing body such that it is fixed in rotation relative to the guide body and, at least in the rotary position of the pivot bearing body that corresponds to the rest position, changes over to the latching position automatically, as a result of a spring element provided therein.

44. A trailer coupling according to claim 43, wherein once the rotary position of the pivot bearing body that corresponds to the rest position has been reached, the latching arrangement for the rest position changes over to the latching position automatically, as a result of a spring element provided therein.

45. A trailer coupling according to claim 43, wherein the latching arrangement for the rest position is releasable in dependence on a particular functional condition of the trailer coupling.

46. A trailer coupling according to claim 45, wherein the latching arrangement for the rest position is releasable at the start of pivoting of the pivot bearing body from the rest position into the operative position.

47. A trailer coupling according to claim 45, wherein the latching arrangement for the rest position is releasable by an electrically operable drive unit.

48. A trailer coupling according to claim 45, wherein a drive unit, which is provided for pivoting the ball neck, changes the latching arrangement for the rest position over to the free-movement position by way of a pivot drive for the ball neck.

49. A trailer coupling according to claim 48, wherein the pivot drive changes over the latching arrangement for the rest position to the free-movement position before pivoting of the pivot bearing body.

50. A trailer coupling according to claim 48, wherein the latching release body is actuable by a pivot drive for the pivot bearing body.

51. A trailer coupling according to claim 50, wherein the pivot drive for pivoting the pivot bearing body from the rest position into the operative position is first movable freely relative to the pivot bearing body and then pivots the pivot bearing body between the rest position and the operative position.

52. A trailer coupling according to claim 51, wherein the latching arrangement for the rest position is changed over by the pivot drive during the free movement from the rest position latching position to the free-movement position.

53. A trailer coupling according to claim 43, wherein the latching arrangement for the rest position includes a latching body that is arranged in one of the guide body and the pivot bearing body, is movable in a latching direction and is engageable with a latching receptacle that is arranged in another of one of the guide body and the pivot bearing body.

54. A trailer coupling according to claim 53, wherein the latching body that is movable in the latching direction is arranged in the guide body, and in that the latching receptacle is arranged in the pivot bearing body.

55. A trailer coupling according to claim 53, wherein the latching direction runs parallel to the pivot axis.

56. A trailer coupling according to claim 53, wherein there is associated with the latching receptacle a latching release body which, on actuation, displaces the latching body from the latching receptacle.

57. A trailer coupling including a ball neck, which is movable between an operative position and a rest position and which has a pivot bearing body arranged at a first end and a coupling ball arranged at a second end, a pivot bearing unit, which is arranged fixed to the vehicle and by means of which the pivot bearing body is received such that it is pivotal about a pivot axis between the operative position and the rest position, and a rotation blocking arrangement having at least two rotation blocking bodies, which are guided by means of a guide body to be movable in a guide direction having at least one component in the radial direction relative to the pivot axis, wherein, in the operative position, the rotation blocking bodies are movable into a rotation blocking position by a movement in the guide direction and, in this rotation blocking position, engage with a receptacle in the pivot bearing body in order to block a pivotal movement of the pivot bearing body about the pivot axis relative to the guide body, and are movable into a release position and, in this release position, are not in engagement with the respective receptacle, and having an actuating body which has a respective cam face, that runs transversely to the guide direction, for each of the rotation blocking bodies and which is arranged to be rotatable about the pivot axis and as a result of the rotary movement whereof in a direction of actuation the at least two rotation blocking bodies are movable and urgeable in the guide direction, a latching arrangement for the release position is provided which, in a release position of the actuating body, is movable between a latch release position that allows movement of the actuating body in relation to the guide body and a latching position that fixes the actuating body in relation to the guide body, and which is urged in the direction of the latching position by a spring element, at least in the release position of the actuating body;

wherein the actuating both is urged in the direction of its rotation blocking position by an elastic energy store; and wherein the actuating body is twistable by means of the actuating arrangement in opposition to the direction of rotation brought about by the elastic energy store.

58. A trailer coupling including a ball neck, which is movable between an operative position and a rest position and which has a pivot bearing body arranged at a first end and a coupling ball arranged at a second end, a pivot bearing unit, which is arranged fixed to the vehicle and by means of which the pivot bearing body is received such that it is pivotal about a pivot axis between the operative position and the rest position, and a rotation blocking arrangement having at least two rotation blocking bodies, which are guided by means of a guide body to be movable in a guide direction having at least one component in the radial direction relative to the pivot axis, wherein, in the operative position, the rotation blocking bodies are movable into a rotation blocking position by a movement in the guide direction and, in this rotation blocking position, engage with a receptacle in the pivot bearing body in order to block a pivotal movement of the pivot bearing body about the pivot axis relative to the guide body, and are movable into a release position and, in this release position, are not in engagement with the respective receptacle, and having an actuating body which has a respective cam face, that runs transversely to the guide direction, for each of the rotation blocking bodies and which is arranged to be rotatable about the pivot axis and as a result of the rotary movement whereof in a direction of actuation the at least two rotation blocking bodies are movable and urgeable in the guide direction, a latching arrangement for the release position is provided which, in a release position of the actuating body, is movable between a latch release position that allows movement of the actuating body in relation to the guide body, and a latching position that fixes the actuating body in relation to the guide body, and which is urged in the direction of the latching position by a spring element, at least in the release position of the actuating body, wherein a motorised drive is provided as a pivot drive for performing the pivotal movement of the pivot bearing body;

wherein a drive for the rotation blocking arrangement and the drive for the pivotal movement of the pivot bearing body are coupled by a planetary gearing mechanism;

wherein there is provided a planetary gearing mechanism that is driven by a drive unit, in that a power take-off of the planetary gearing mechanism acts as an actuator on the actuating body in order to move the latter from the rotation blocking position into the release position and in that another power take-off of the planetary gearing mechanism acts as a pivotal drive on the pool bearing body for pivoting the ball neck between the operative position and the rest position; and wherein the latching arrangement is provided for restraint of driving the rotation blocking arrangement.

\* \* \* \* \*

UNITED STATES PATENT AND TRADEMARK OFFICE
CERTIFICATE OF CORRECTION

PATENT NO. : 10,189,323 B2
APPLICATION NO. : 15/261323
DATED : January 29, 2019
INVENTOR(S) : Aleksej Kadnikov et al.

Page 1 of 1

It is certified that error appears in the above-identified patent and that said Letters Patent is hereby corrected as shown below:

In the Claims

In Column 24, Line 10, Claim 37, the word "avis" should be --axis--

In Column 24, Line 22, Claim 37, the word "allose" should be --allows--

In Column 26, Line 48, Claim 57, the word "both" should be --body--

In Column 28, Line 14, Claim 58, the word "pool" should be --pivot--

Signed and Sealed this
Fourteenth Day of May, 2019

Andrei Iancu
*Director of the United States Patent and Trademark Office*